(12) United States Patent
Yamamoto

(10) Patent No.: US 7,599,123 B2
(45) Date of Patent: Oct. 6, 2009

(54) ZOOM LENS SYSTEM, IMAGING APPARATUS AND METHOD FOR VARYING FOCAL LENGTH

(75) Inventor: Hiroshi Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 68 days.

(21) Appl. No.: 11/765,816

(22) Filed: Jun. 20, 2007

(65) Prior Publication Data

US 2008/0002263 A1 Jan. 3, 2008

(30) Foreign Application Priority Data

Jun. 22, 2006 (JP) .............................. 2006-173010
Jun. 11, 2007 (JP) .............................. 2007-154234

(51) Int. Cl.
*G02B 15/14* (2006.01)

(52) U.S. Cl. ..................... 359/686; 359/683

(58) Field of Classification Search ................. 359/686, 359/683
See application file for complete search history.

(56) References Cited

U.S. PATENT DOCUMENTS

| | | | | |
|---|---|---|---|---|
| 5,264,965 A * | 11/1993 | Hirakawa | .................. | 359/686 |
| 5,576,890 A | 11/1996 | Tanaka et al. | | |
| 5,585,970 A | 12/1996 | Shibayama | | |
| 6,710,931 B1 * | 3/2004 | Misaka | .................. | 359/686 |
| 6,809,880 B2 * | 10/2004 | Murata | .................. | 359/686 |
| 7,102,829 B2 | 9/2006 | Nishimura | | |
| 7,106,520 B2 | 9/2006 | Saori | | |
| 7,196,852 B2 | 3/2007 | Nishimura | | |
| 7,333,273 B2 * | 2/2008 | Sensui | .................. | 359/686 |
| 7,382,550 B2 * | 6/2008 | Nishimura | .................. | 359/686 |

FOREIGN PATENT DOCUMENTS

| | | |
|---|---|---|
| JP | 04-051006 A | 2/1992 |
| JP | 5-19170 A | 1/1993 |
| JP | 11-174328 A | 7/1999 |
| JP | 2000-338397 A | 12/2000 |
| JP | 2001-116992 A | 4/2001 |

OTHER PUBLICATIONS

1996, Schott AG, Germany, XP002450003, Refractive index (nd) as a function of the constringence (nu d) for the sodium d-line [nd = nd (nu d)] for the commercially available optical glasses from Schott AG.

* cited by examiner

*Primary Examiner*—Darryl J Collins
*Assistant Examiner*—Zachary Wilkes
(74) *Attorney, Agent, or Firm*—Miles & Stockbridge P.C.

(57) ABSTRACT

Providing a zoom lens system being inexpensive, compact and lightweight with high optical performance, and an imaging apparatus, and a method for varying a focal length. The zoom lens system includes, in order from an object, a first lens group having negative refractive power, a second lens group having positive refractive power, a third lens group having negative refractive power, and a fourth lens group having positive refractive power. Upon zooming from a wide-angle end state to a telephoto end state, a distance between the first and second lens groups decreases, a distance between the second and third lens groups increases, and a distance between the third and fourth lens groups decreases. The second lens group consists of two positive lenses or less and one negative lens. The fourth lens group consists of two positive lenses or less and one negative lens. Given conditions are satisfied.

16 Claims, 13 Drawing Sheets

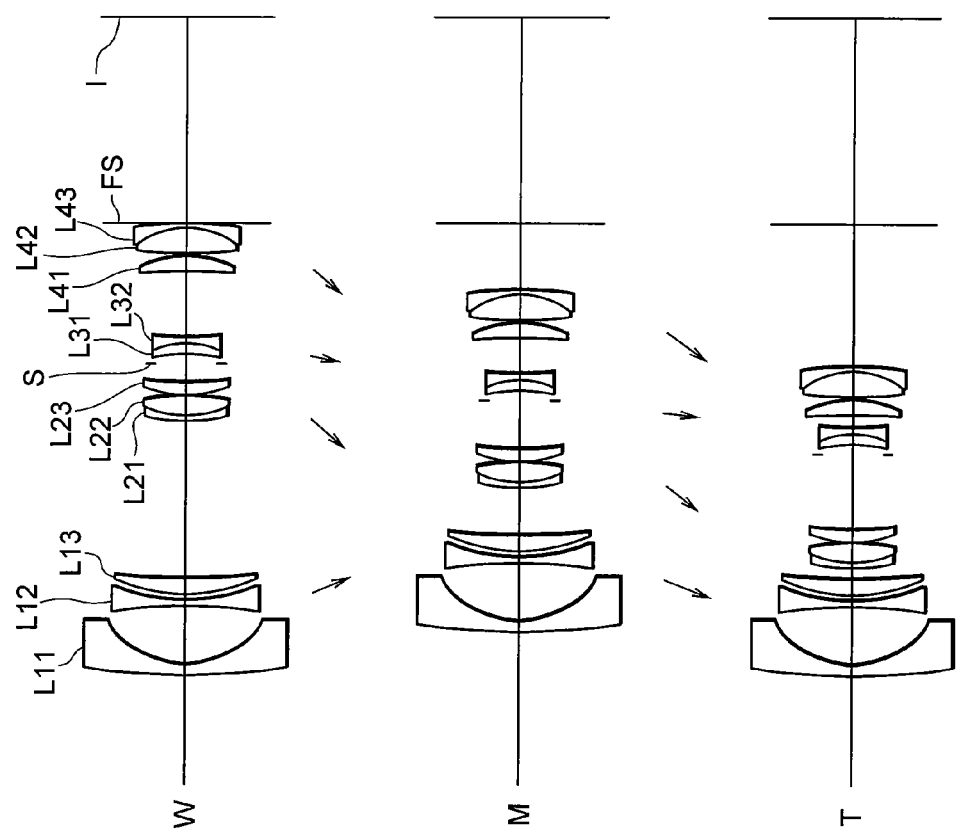

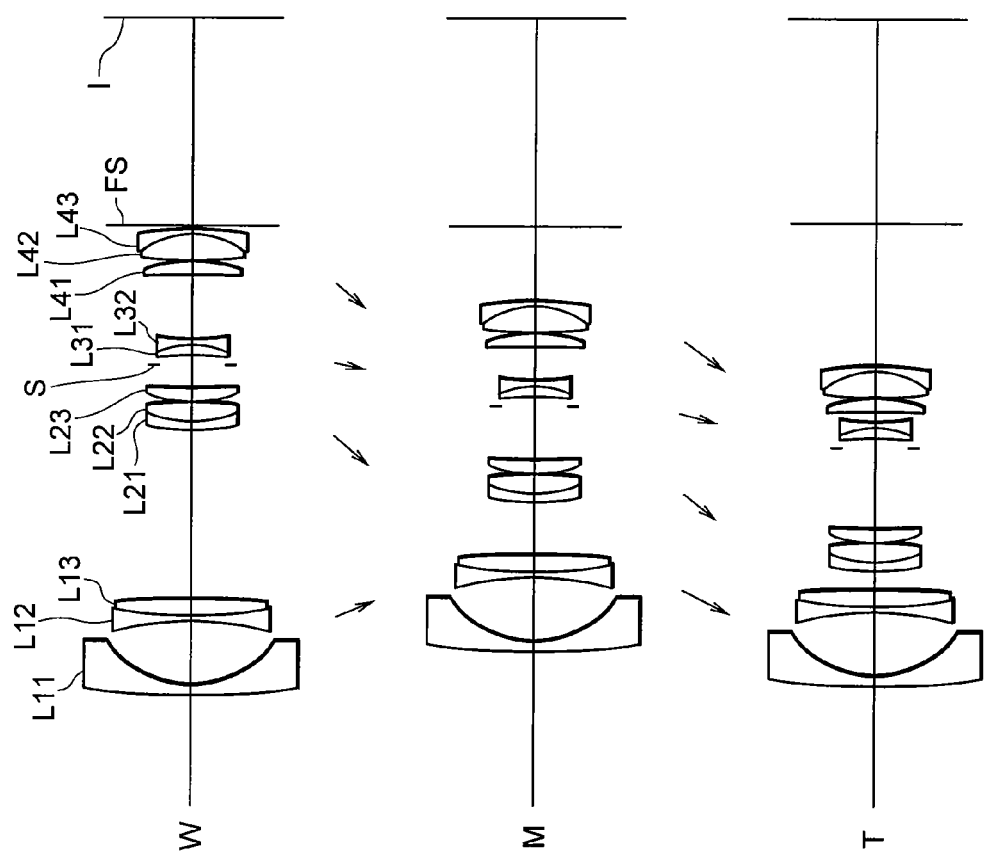

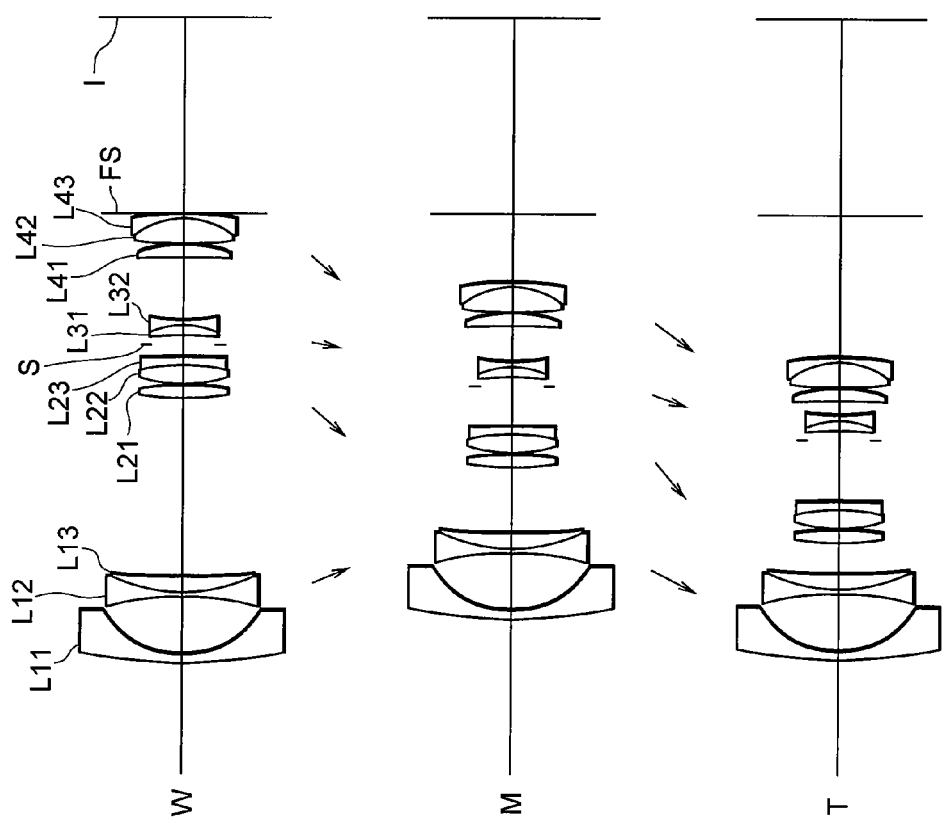

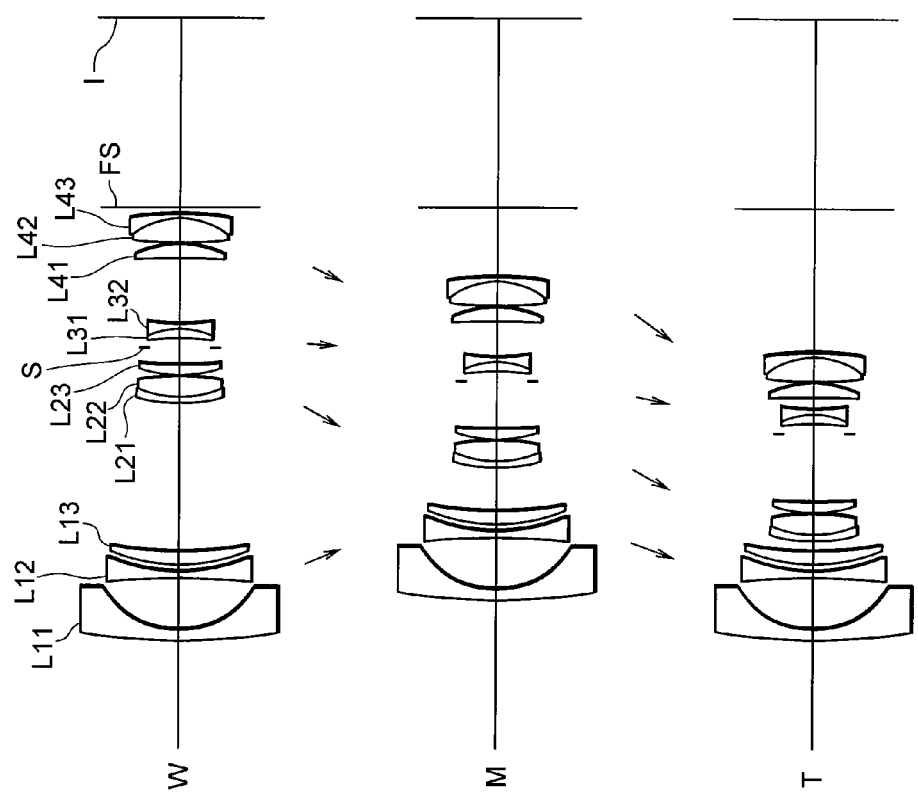

ZOOM LENS SYSTEM, IMAGING APPARATUS AND METHOD FOR VARYING FOCAL LENGTH

The disclosure of the following priority applications are herein incorporated by reference:

Japanese Patent Application No. 2006-173010 filed on Jun. 22, 2006; and

Japanese Patent Application No. 2007-154234 filed on Jun. 11, 2007.

BACKGROUND OF THE INVENTION

1. Field of the Invention

The present invention relates to a zoom lens system suitable for a single-lens reflex camera and a digital camera, an imaging apparatus, and a method for varying a focal length of the zoom lens system.

2. Related Background Art

There has been proposed a four-lens-group zoom lens systems composed of, in order from an object, a first lens group having negative refractive power, a second lens group having positive refractive power, a third lens group having negative refractive power, and a fourth lens group having positive refractive power in Japanese Patent Application Laid-Open No. 2000-338397.

Although the conventional zoom lens system has a wide angle of view and a given zoom ratio as a standard zoom lens system and is compact and lightweight with a reasonable price, it has been difficult to obtain preferable optical performance over entire zoom range. Accordingly, higher optical performance has been expected in such a zoom lens system.

SUMMARY OF THE INVENTION

The present invention is made in view of the aforementioned problems and has an object to provide a zoom lens system that is inexpensive, compact and lightweight with high optical performance, and to provide an imaging apparatus and a method for varying a focal length of the zoom lens system.

According to a first aspect of the present invention, there is provided a zoom lens system including, in order from an object, a first lens group having negative refractive power, a second lens group having positive refractive power, a third lens group having negative refractive power, and a fourth lens group having positive refractive power. Upon varying a focal length from a wide-angle end state to a telephoto end state, a distance between the first lens group and the second lens group decreases, a distance between the second lens group and the third lens group increases, and a distance between the third lens group and the fourth lens group decreases. The second lens group consists of two positive lenses or less and one negative lens. The fourth lens group consists of two positive lenses or less and one negative lens. The following conditional expressions (1), (2), (3) and (4) are satisfied:

$$25 \leq vd2n \leq 40 \quad (1)$$

when $25 \leq vd2n \leq 30$ $-0.035 \times vd2n + 2.63 \leq nd2n \leq 1.79$ when $30 < vd2n \leq 35$ $1.58 < nd2n \leq 1.79$ when $35 < vd2n \leq 40$ $$1.58 < nd2n \leq -0.034 \times vd2n + 2.98 \quad (2)$$

$$25 \leq vd4n \leq 40 \quad (3)$$

when $25 \leq vd4n \leq 30$ $-0.035 \times vd4n + 2.63 \leq nd4n \leq 1.79$ when $30 < vd4n \leq 35$ $1.58 < nd4n \leq 1.79$ when $35 < vd4n \leq 40$ $$1.58 < nd4n \leq -0.034 \times vd4n + 2.98 \quad (4)$$

where vd2n denotes Abbe number of the negative lens in the second lens group at d-line, which has a wavelength $\lambda = 587.6$ nm, nd2n denotes a refractive index of the negative lens in the second lens group at d-line, vd4n denotes Abbe number of the negative lens in the fourth lens group at d-line, and nd4n denotes a refractive index of the negative lens in the fourth lens group at d-line.

In a zoom lens system according to the first aspect of the present invention, it is preferable that the first lens group includes a positive lens, and the following conditional expressions (5) and (6) are preferably satisfied:

$$25 \leq vd1p \leq 40 \quad (5)$$

when $25 \leq vd1p \leq 30$ $-0.035 \times vd1p + 2.63 \leq nd1p \leq 1.79$ when $30 < vd1p \leq 35$ $1.58 < nd1p \leq 1.79$ when $35 < vd1p \leq 40$ $$1.58 < nd1p \leq -0.034 \times vd1p + 2.98 \quad (6)$$

where vd1p denotes Abbe number of the positive lens in the first lens group at d-line, which has a wavelength $\lambda = 587.6$ nm, nd1p denotes a refractive index of the positive lens in the first lens group at d-line.

In a zoom lens system according to the first aspect of the present invention, it is preferable that the first lens group includes a negative lens and the following conditional expressions (7) and (8) are preferably satisfied:

$$30 \leq vd1n \leq 71 \quad (7)$$

when $30 \leq vd1n \leq 36$ $-0.013 \times vd1n + 2.083 \leq nd1n \leq 1.7$ when $36 < vd1n \leq 41$ $-0.013 \times vd1n + 2.083 < nd1n \leq -0.004 \times vd1n + 1.844$ when $41 < vd1n \leq 51$ $-0.004 \times vd1n + 1.714 < nd1n \leq -0.004 \times vd1n + 1.844$ when $51 < vd1n \leq 61$ $-0.0015 \times vd1n + 1.5865 < nd1n \leq -0.004 \times vd1n + 1.844$ when $61 < vd1n \leq 71$ $$-0.0015 \times vd1n + 1.5865 < nd1p \leq -0.009 \times vd1n + 2.149 \quad (8)$$

where vd1n denotes Abbe number of the negative lens in the first lens group at d-line, which has a wavelength λ=587.6 nm, nd1n denotes a refractive index of the negative lens in the first lens group at d-line.

In a zoom lens system according to the first aspect of the present invention, the following conditional expression (9) is preferably satisfied:

$$1.2 < f2/fw < 2.0 \qquad (9)$$

where f2 denotes a focal length of the second lens group, and fw denotes a focal length of the zoom lens system in the wide-angle end state.

In a zoom lens system according to the first aspect of the present invention, it is preferable that the first lens group has at least one aspherical lens.

In a zoom lens system according to the first aspect of the present invention, it is preferable that the first lens group consists of two negative lenses and one positive lens.

In a zoom lens system according to the first aspect of the present invention, it is preferable that the second lens group and the fourth lens group are moved in a body upon varying a focal length from the wide-angle end state to the telephoto end state.

In a zoom lens system according to the first aspect of the present invention, it is preferable that the third lens group consists of a cemented negative lens constructed by a positive lens cemented with a negative lens, and the following conditional expression (10) is preferably satisfied:

$$-0.1 < nd3p - nd3n < 0.1 \qquad (10)$$

where nd3p denotes the refractive index of the positive lens in the third lens group at d-line, which has a wavelength λ=587.6 nm, and nd3n denotes the refractive index of the negative lens in the third lens group at d-line.

In a zoom lens system according to the first aspect of the present invention, it is preferable that an aperture is disposed to the image side of the third lens group adjacent thereto.

According to a second aspect of the present invention, there is provided an imaging apparatus equipped with the zoom lens system according to the first aspect of the present invention.

According to a third aspect of the present invention, there is provided a method for varying a focal length of a zoom lens system that includes a first lens group, a second lens group, a third lens group, and a fourth lens group, the method comprising steps of: providing the first lens group having negative refractive power, the second lens group having positive refractive power and consisting of two positive lenses or less and one negative lens, the third lens group having negative refractive power, and a fourth lens group having positive refractive power and consisting of two positive lenses or less and one negative lens; varying a focal length from a wide-angle end state to a telephoto end state by decreasing a distance between the first lens group and the second lens group, increasing a distance between the second lens group and the third lens group, and decreasing a distance between the third lens group and the fourth lens group; satisfying the following conditional expressions (1), (2), (3) and (4):

$$25 \leq vd2n \leq 40 \qquad (1)$$

when $25 \leq vd2n \leq 30$ $$-0.035 \times vd2n + 2.63 \leq nd2n \leq 1.79$$

when $30 < vd2n \leq 35$ $$1.58 < nd2n \leq 1.79$$

when $35 < vd2n \leq 40$ $$1.58 < nd2n \leq -0.034 \times vd2n + 2.98 \qquad (2)$$

$$25 \leq vd4n \leq 40 \qquad (3)$$

when $25 \leq vd4n \leq 30$ $$-0.035 \times vd4n + 2.63 \leq nd4n \leq 1.79$$

when $30 < vd4n \leq 35$ $$1.58 < nd4n \leq 1.79$$

when $35 < vd4n \leq 40$ $$1.58 < nd4n \leq -0.034 \times vd4n + 2.98 \qquad (4)$$

where vd2n denotes Abbe number of the negative lens in the second lens group at d-line, which has a wavelength λ=587.6 nm, nd2n denotes a refractive index of the negative lens in the second lens group at d-line, vd4n denotes Abbe number of the negative lens in the fourth lens group at d-line, and nd4n denotes a refractive index of the negative lens in the fourth lens group at d-line.

In the third aspect of the present invention, it is preferable to further include a step of satisfying the following conditional expressions (5) and (6):

$$25 \leq vd1p \leq 40 \qquad (5)$$

when $25 \leq vd1p \leq 30$ $$-0.035 \times vd1p + 2.63 \leq nd1p \leq 1.79$$

when $30 < vd1p \leq 35$ $$1.58 < nd1p \leq 1.79$$

when $35 < vd1p \leq 40$ $$1.58 < nd1p \leq -0.034 \times vd1p + 2.98 \qquad (6)$$

where vd1p denotes Abbe number of the positive lens in the first lens group at d-line, which has a wavelength λ=587.6 nm, nd1p denotes a refractive index of the positive lens in the first lens group at d-line.

In the third aspect of the present invention, it is preferable to further include steps of: providing the first lens group that has a negative lens; and satisfying the following conditional expressions (7) and (8):

$$30 \leq vd1n \leq 71 \qquad (7)$$

when $30 \leq vd1n \leq 36$ $$-0.013 \times vd1n + 2.083 \leq nd1n \leq 1.7$$

when $36 < vd1n \leq 41$ $$-0.013 \times vd1n + 2.083 < nd1n \leq -0.004 \times vd1n + 1.844$$

when $41 < vd1n \leq 51$ $$-0.004 \times vd1n + 1.714 < nd1n \leq -0.004 \times vd1n + 1.844$$

when $51 < vd1n \leq 61$ $$-0.0015 \times vd1n+1.5865 < nd1n \leq -0.004 \times vd1n+1.844$$

when $61 < vd1n \leq 71$ \hfill (8)

$$-0.0015 \times vd1n+1.5865 < nd1p \leq -0.009 \times vd1n+2.149$$

where vd1n denotes Abbe number of the negative lens in the first lens group at d-line, which has a wavelength λ=587.6 nm, nd1n denotes a refractive index of the negative lens in the first lens group at d-line.

In the third aspect of the present invention, it is preferable to further include a step of satisfying the following conditional expression (9):

$$1.2 < f2/fw < 2.0 \quad (9)$$

where f2 denotes a focal length of the second lens group, and fw denotes a focal length of the zoom lens system in the wide-angle end state.

Other features and advantages according to the present invention will be readily understood from the detailed description of the preferred embodiments in conjunction with the accompanying drawings.

BRIEF DESCRIPTION OF THE DRAWINGS

FIG. 1 is a diagram showing a lens configuration of a zoom lens system according to Example 1.

FIGS. 2A, 2B, and 2C are graphs showing various aberrations of the zoom lens system according to Example 1 in which FIG. 2A shows various aberrations in a wide-angle end state, FIG. 2B shows various aberrations in an intermediate focal length state, and FIG. 2C shows various aberrations in a telephoto end state.

FIG. 3 is a diagram showing a lens configuration of a zoom lens system according to Example 2.

FIGS. 4A, 4B, and 4C are graphs showing various aberrations of the zoom lens system according to Example 2 in which FIG. 4A shows various aberrations in a wide-angle end state, FIG. 4B shows various aberrations in an intermediate focal length state, and FIG. 4C shows various aberrations in a telephoto end state.

FIG. 5 is a diagram showing a lens configuration of a zoom lens system according to Example 3.

FIGS. 6A, 6B, and 6C are graphs showing various aberrations of the zoom lens system according to Example 3 in which FIG. 6A shows various aberrations in a wide-angle end state, FIG. 6B shows various aberrations in an intermediate focal length state, and FIG. 6C shows various aberrations in a telephoto end state.

FIG. 7 is a diagram showing a lens configuration of a zoom lens system according to Example 4.

FIGS. 8A, 8B, and 8C are graphs showing various aberrations of the zoom lens system according to Example 4 in which FIG. 8A shows various aberrations in a wide-angle end state, FIG. 8B shows various aberrations in an intermediate focal length state, and FIG. 8C shows various aberrations in a telephoto end state.

FIGS. 10A, 10B, and 10C are graphs showing various aberrations of the zoom lens system according to Example 5 in which FIG. 10A shows various aberrations in a wide-angle end state, FIG. 10B shows various aberrations in an intermediate focal length state, and FIG. 10C shows various aberrations in a telephoto end state.

FIGS. 12A, 12B, and 12C are graphs showing various aberrations of the zoom lens system according to Example 6 in which FIG. 12A shows various aberrations in a wide-angle end state, FIG. 12B shows various aberrations in an intermediate focal length state, and FIG. 12C shows various aberrations in a telephoto end state.

DESCRIPTION OF THE MOST PREFERRED EMBODIMENT

Figure 2A:
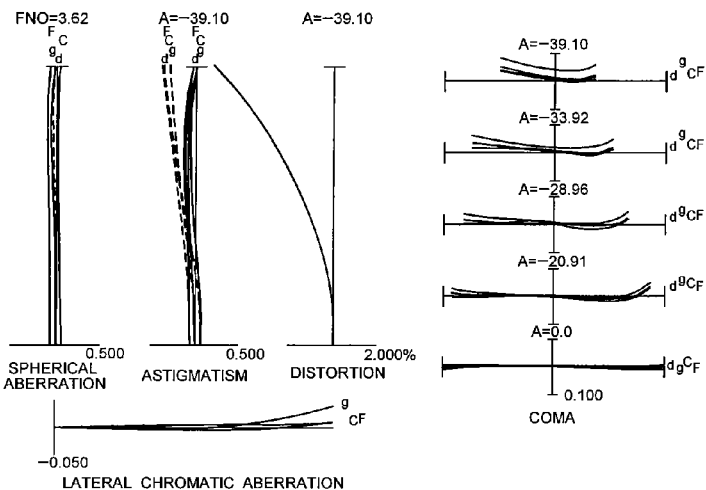

A zoom lens system, an imaging apparatus, and a method for varying a focal length of the zoom lens system according to the present application are explained below.

The zoom lens system includes, in order from an object, a first lens group having negative refractive power, a second lens group having positive refractive power, a third lens group having negative refractive power, and a fourth lens group having positive refractive power. When a state of lens group positions varies from a wide-angle end state to a telephoto end state, a distance between the first lens group and the second lens group decreases, a distance between the second lens group and the third lens group increases, and a distance between the third lens group and the fourth lens group decreases.

In the zoom lens system according to the present application, the second lens group consists of two positive lenses or less and one negative lens, the fourth lens group consists of two positive lenses or less and one negative lens, and the following conditional expressions (1), (2), (3), and (4) are satisfied:

$$25 \leq vd2n \leq 40 \quad (1)$$

when $25 \leq vd2n \leq 30$ $$-0.035 \times vd2n+2.63 \leq nd2n \leq 1.79$$

when $30 < vd2n \leq 35$ $$1.58 < nd2n \leq 1.79$$

when $35 < vd2n \leq 40$ $$1.58 < nd2n \leq -0.034 \times vd2n+2.98 \quad (2)$$

$$25 \leq vd4n \leq 40 \quad (3)$$

when $25 \leq vd4n \leq 30$ $$-0.035 \times vd4n+2.63 \leq nd4n \leq 1.79$$

when $30 < vd4n \leq 35$ $$1.58 < nd4n \leq 1.79$$

when $35 < vd4n \leq 40$ $$1.58 < nd4n \leq -0.034 \times vd4n+2.98 \quad (4)$$

where vd2n denotes Abbe number of the negative lens in the second lens group at d-line, which has a wavelength λ=587.6 nm, nd2n denotes a refractive index of the negative lens in the second lens group at d-line, vd4n denotes Abbe number of the negative lens in the fourth lens group at d-line, and nd4n denotes a refractive index of the negative lens in the fourth lens group at d-line.

As described above, in the zoom lens system according to the present application, each of the second lens group and the fourth lens group consists of two positive lenses or less and one negative lens. In this manner, with locating a negative lens in each of the second lens group and the fourth lens group, it becomes possible to correct chromatic aberration over entire zoom range. Moreover, in the zoom lens system, the more the number of the positive lenses becomes, the better correction of various aberrations can be expected. However, this is against the purpose of the present invention to be inexpensive, compact and lightweight, so that it is undesirable.

Conditional expression (1) defines an appropriate range of Abbe number of the negative lens in the second lens group having positive refractive power.

When the value vd2n exceeds the upper limit of conditional expression (1), lateral chromatic aberration in the second lens group is excessively corrected.

On the other hand, when the value vd2n falls below the lower limit of conditional expression (1), longitudinal chromatic aberration in the second lens group is excessively corrected in the telephoto end state. Moreover, variation in lateral chromatic aberration upon zooming from the wide-angle end state to the telephoto end state becomes large, so that it becomes difficult to obtain preferable optical performance over entire zooming range.

Conditional expression (2) defines an appropriate range of the refractive index of the negative lens in the second lens group.

When the value nd2n exceeds the upper limit of conditional expression (2), the refractive index of the negative lens becomes large and Petzval sum becomes large. Accordingly, it becomes difficult to preferably correct astigmatism in the telephoto end state, so that it is undesirable.

On the other hand, when the value nd2n falls below the lower limit of conditional expression (2), the refractive index of the negative lens becomes small, so that it becomes difficult to preferably correct various aberrations such as spherical aberration and coma.

Conditional expression (3) defines an appropriate range of Abbe number of the negative lens in the fourth lens group having positive refractive power.

When the value vd4n exceeds the upper limit of conditional expression (3), it becomes difficult to sufficiently correct lateral chromatic aberration in the fourth lens group. In a general zoom lens system, in order to preferably correct lateral chromatic aberration over entire zoom range, chromatic aberration of each lens group composing the zoom lens system has to be corrected in each lens group. In the zoom lens system according to the present application, in order to correct lateral chromatic aberration in the fourth lens group, a glass material such as fluor crown glass, which is expensive and has large specific gravity, has to be used for a positive lens in the fourth lens group. Accordingly, this is against the purpose of the present invention, so that it is undesirable.

On the other hand, when the value vd4n falls below the lower limit of conditional expression (3), lateral chromatic aberration in the wide-angle end state and longitudinal chromatic aberration in the telephoto end state in the fourth lens group are excessively corrected, so that it becomes difficult to obtain preferable optical performance over entire zoom range.

Conditional expression (4) defines an appropriate range of the refractive index of the negative lens in the fourth lens group.

When the value nd4n exceeds the upper limit of conditional expression (4), the refractive index of the negative lens becomes large and Petzval sum becomes large. Accordingly, it becomes difficult to preferably correct astigmatism in the telephoto end state, so that it is undesirable.

On the other hand, when the value nd4n falls below the lower limit of conditional expression (4), the refractive index of the negative lens becomes small, so that it becomes difficult to preferably correct various aberrations such as spherical aberration and coma.

In the zoom lens system according to the present application, the first lens group has a positive lens, and the following conditional expressions (5) and (6) are preferably satisfied:

$$25 \leq vd1p \leq 40 \tag{5}$$

when $25 \leq vd1p \leq 30$ $-0.035 \times vd1p + 2.63 \leq nd1p \leq 1.79$ when $30 < vd1p \leq 35$ $1.58 < nd1p \leq 1.79$ when $35 < vd1p \leq 40$ $$1.58 < nd1p \leq -0.034 \times vd1p + 2.98 \tag{6}$$

where vd1p denotes Abbe number of the positive lens in the first lens group at d-line, which has a wavelength λ=587.6 nm, nd1p denotes a refractive index of the positive lens in the first lens group at d-line.

Conditional expression (5) defines an appropriate range of Abbe number of the positive lens in the first lens group having negative refractive power.

When the value vd1p exceeds the upper limit of conditional expression (5), it becomes impossible to sufficiently correct lateral chromatic aberration in the wide-angle end state. In order to correct lateral chromatic aberration in the first lens group, a glass material such as fluor crown glass, which is expensive and has large specific gravity, has to be used for a negative lens in the first lens group. Accordingly, this is against the purpose of the present invention, so that it is undesirable.

Conditional expression (6) defines an appropriate range of the refractive index of the positive lens in the first lens group.

When the value nd1p exceeds the upper limit of conditional expression (6), the refractive index of the positive lens becomes large, and Petzval sum becomes small. Accordingly, it becomes difficult to preferably correct astigmatism in the wide-angle end state.

On the other hand, when the value nd1p falls below the lower limit of conditional expression (6), the refractive index of the positive lens becomes small, so that it becomes difficult to preferably correct various aberrations such as spherical aberration and coma.

In the zoom lens system according to the present application, the first lens group has a negative lens, and the following conditional expressions (7) and (8) are preferably satisfied:

$$30 \leq vd1n \leq 71 \tag{7}$$

when $30 \leq vd1n \leq 36$ $-0.013 \times vd1n + 2.083 \leq nd1n \leq 1.7$ when $36 < vd1n \leq 41$ $-0.013 \times vd1n + 2.083 < nd1n \leq -0.004 \times vd1n + 1.844$ when $41 < vd1n \leq 51$ $-0.004 \times vd1n + 1.714 < nd1n \leq -0.004 \times vd1n + 1.844$ when $51 < vd1n \leq 61$ $$-0.0015 \times vd1n+1.5865 < nd1n \leq -0.004 \times vd1n+1.844$$

when $61 < vd1n \leq 71$ $$-0.0015 \times vd1n+1.5865 < nd1p \leq -0.009 \times vd1n+2.149 \quad (8)$$

where vd1n denotes Abbe number of the negative lens in the first lens group at d-line, which has a wavelength λ=587.6 nm, nd1n denotes a refractive index of the negative lens in the first lens group at d-line.

Conditional expression (7) defines an appropriate range of Abbe number of the negative lens in the first lens group.

When the value vd1n falls below the lower limit of conditional expression (7), it becomes impossible to sufficiently correct lateral chromatic aberration in the wide-angle end state, and it becomes difficult to correct lateral chromatic aberration over entire zoom range.

On the other hand, when the value vd1n exceeds the upper limit of conditional expression (7), a glass material such as fluor crown glass, which is expensive and has large specific gravity, has to be used for the negative lens. In order to avoid these weight and cost, the number of lenses has to be reduced. As a result, it becomes impossible to sufficiently correct lateral chromatic aberration in the wide-angle end state, so that it becomes difficult to correct lateral chromatic aberration over entire zoom range. In other words, similar problems generated when the value vd1n falls below the lower limit of conditional expression (7), which has been explained above, arise more conspicuously.

Conditional expression (8) defines an appropriate range of the refractive index of the negative lens in the first lens group.

When the value nd1n falls below the lower limit of conditional expression (8), the radius of curvature of the negative lens becomes small, so that it becomes difficult to correct lateral chromatic aberration and negative distortion simultaneously.

On the other hand, when the value nd1n exceeds the upper limit of conditional expression (8), a glass material such as dense crown glass or lanthanum crown glass, which has large specific gravity and is expensive, has to be used for the negative lens. In order to avoid these weight and cost, the number of lenses has to be reduced. As a result, it becomes difficult to correct lateral chromatic aberration and negative distortion simultaneously. In other words, similar problems generated when the value nd1n falls below the lower limit of conditional expression (8), which has been explained above, arise more conspicuously.

In the zoom lens system according to the present application, the following conditional expression (9) is preferably satisfied:

$$1.2 < f2/fw < 2.0 \quad (9)$$

where f2 denotes the focal length of the second lens group, and fw denotes a focal length of the zoom lens system in the wide-angle end state.

Conditional expression (9) defines an appropriate range of the focal length of the second lens group.

When the ratio f2/fw is equal to or exceeds the upper limit of conditional expression (9), the refractive index of the second lens group becomes small. As a result, in order to secure a sufficient zoom ratio, it becomes difficult to correct distortion in the wide-angle end state and coma in the intermediate focal length state.

On the other hand, when the ratio f2/fw is equal to or falls below the lower limit of conditional expression (9), it becomes difficult toD correct spherical aberration in the telephoto end state.

In order to secure the effect of the present invention, it is preferable to set the upper limit of conditional expression (9) to 1.8. In order to secure the effect of the present invention, it is preferable to set the lower limit of conditional expression (9) to 1.4.

In the zoom lens system according to the present application, the first lens group preferably includes at least one aspherical lens.

With including an aspherical lens in the first lens group, it becomes possible to preferably correct distortion and curvature of field in the wide-angle end state.

In the zoom lens system according to the present application, the first lens group preferably consists of two negative lenses and one positive lens.

With arranging a plurality of negative lenses in the first lens group, it becomes possible to preferably correct curvature of field and distortion in the wide-angle end state. Moreover, spherical aberration and chromatic aberration in the telephoto end state generated by the two negative lenses are preferably corrected by the positive lens.

In the zoom lens system according to the present application, it is preferable that the second lens group and the fourth lens group are moved in a body upon zooming from the wide-angle end state to the telephoto end state.

Here, upon zooming from the wide-angle end state to the telephoto end state, by moving all of four lens groups with different moving speed with each other, variation in aberration upon zooming can be corrected preferably. On the other hand, in the zoom lens system according to the present application, by moving the second lens group and the fourth lens group in a body, the lens barrel structure can be simplified with respect to the case that all of four lens groups move with different speed with each other. Accordingly, variation in spherical aberration or curvature of field caused by mechanical error such as decentering can be reduced, so that it is desirable.

In the zoom lens system according to the present application, the third lens group preferably consists of a cemented negative lens constructed by a positive lens cemented with a negative lens, and the following conditional expression (10) is preferably satisfied:

$$-0.1 < nd3p - nd3n < 0.1 \quad (10)$$

where nd3p denotes the refractive index of the positive lens in the third lens group at d-line, which has a wavelength λ=587.6 nm, and nd3n denotes the refractive index of the negative lens in the third lens group at d-line.

Conditional expression (10) defines an appropriate range of difference in the refractive index between the positive lens and the negative lens in the third lens group.

When the difference nd3p−nd3n is equal to or exceeds the upper limit of conditional expression (10), coma is generated in the wide-angle end state.

On the other hand, when the difference nd3p−nd3n is equal to or falls below the lower limit of conditional expression (10), coma is generated in the wide-angle end state. Accordingly, it becomes difficult to preferably correct aberration in either case.

In order to secure the effect of the present invention, it is preferable to set the lower limit of conditional expression (10) to 0. In order to secure the effect of the present invention, it is preferable to set the upper limit of conditional expression (10) to 0.08.

In the zoom lens system according to the present application, it is preferable that an aperture stop is disposed to the object side of the third lens group adjacent thereto.

In the zoom lens system according to the present application, by disposing the aperture stop in the vicinity of the third lens group where a bundle of rand rays becomes narrow, the structure of the lens barrel can be simplified, so that it is desirable. Here, the rand ray is a ray that is separated furthest away from the optical axis among rays focusing on an on-axis image.

An imaging apparatus according to the present application is equipped with the above-described zoom lens system.

Accordingly, it becomes possible to realize an imaging apparatus that is inexpensive, compact and lightweight with high optical performance.

A method for varying a focal length of a zoom lens system according to the present application that includes a first lens group, a second lens group, a third lens group, and a fourth lens group, the method comprising steps of: providing the first lens group having negative refractive power, the second lens group having positive refractive power and consisting of two positive lenses or less and one negative lens, the third lens group having negative refractive power, and a fourth lens group having positive refractive power and consisting of two positive lenses or less and one negative lens; varying a focal length from a wide-angle end state to a telephoto end state by decreasing a distance between the first lens group and the second lens group, increasing a distance between the second lens group and the third lens group, and decreasing a distance between the third lens group and the fourth lens group; satisfying the following conditional expressions (1), (2), (3) and (4):

$$25 \leq vd2n \leq 40 \tag{1}$$

when $25 \leq vd2n \leq 30$ $$-0.035 \times vd2n + 2.63 \leq nd2n \leq 1.79$$

when $30 < vd2n \leq 35$ $$1.58 < nd2n \leq 1.79$$

when $35 < vd2n \leq 40$ $$1.58 < nd2n \leq -0.034 \times vd2n + 2.98 \tag{2}$$

$$25 \leq vd4n \leq 40 \tag{3}$$

when $25 \leq vd4n \leq 30$ $$-0.035 \times vd4n + 2.63 \leq nd4n \leq 1.79$$

when $30 < vd4n \leq 35$ $$1.58 < nd4n \leq 1.79$$

when $35 < vd4n \leq 40$ $$1.58 < nd4n \leq -0.034 \times vd4n + 2.98 \tag{4}$$

where vd2n denotes Abbe number of the negative lens in the second lens group at d-line, which has a wavelength λ=587.6 nm, nd2n denotes a refractive index of the negative lens in the second lens group at d-line, vd4n denotes Abbe number of the negative lens in the fourth lens group at d-line, and nd4n denotes a refractive index of the negative lens in the fourth lens group at d-line.

Accordingly, it becomes possible to realize a zoom lens system that is inexpensive, compact and lightweight with high optical performance.

A zoom lens system according to each example of the present embodiment is explained below with reference to accompanying drawings.

Example 1

FIG. 1 is a diagram showing a lens configuration of a zoom lens system according to Example 1.

The zoom lens system according to Example 1 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object.

The second lens group G2 is composed of, in order from the object, a cemented positive lens constructed by a negative meniscus lens L21 having a convex surface facing the object cemented with a double convex positive lens L22, and a positive meniscus lens L23 having a convex surface facing the object.

The third lens group G3 is composed of a cemented negative lens constructed by, in order from the object, a positive meniscus lens L31 having a convex surface facing the image cemented with a double concave negative lens L32.

The fourth lens group G4 is composed of, in order from the object, a positive meniscus lens L41 having a convex surface facing the image, and a cemented positive lens constructed by a double convex positive lens L42 cemented with a negative meniscus lens L43 having a convex surface facing the image.

In the zoom lens system according to Example 1, an aperture stop S is disposed to the object side of the third lens group G3 adjacent thereto, and moved with the third lens group G3 in a body upon zooming from the wide-angle end state to the telephoto end state. A flare stopper FS is disposed to the image side of the fourth lens group G4 adjacent thereto.

In the zoom lens system according to Example 1, upon zooming from the wide-angle end state to the telephoto end state, a distance between the first lens group G1 and the second lens group G2 decreases, a distance between the second lens group G2 and the third lens group G3 increases, and a distance between the third lens group G3 and the fourth lens group G4 decreases.

In the zoom lens system according to Example 1, focusing from infinity to a close object is carried out by moving the first lens group G1 to the object side.

Various values associated with the zoom lens system according to Example 1 are listed in Table 1.

In [Specifications], f denotes a focal length, FNO denotes an f-number, and 2ω denotes an angle of view.

In [Lens Data], the left most column shows the lens surface number counted in order from the object side, the second column shows a radius of curvature "r", the third column shows a distance "d" along the optical axis between the lens surfaces, the fourth column shows a refractive index "nd" of the medium between the lens surfaces at d-line (wavelength λ=587.6 nm), and the fifth column shows an Abbe number of the medium "vd" between the lens surfaces at d-line (wavelength λ=587.6 nm). The position of an aspherical surface is expressed by attaching "*" to the right side of the surface number in [Lens Data] and paraxial radius of curvature is shown in the second column. In [Lens Data], refractive index of the air n=1.000000 is omitted. Radius of curvature r=0.0000 shows a plane surface.

In [Aspherical Data], "κ" denotes a conical coefficient, "Ci" denotes an i-th order aspherical coefficient, and "E-n" denotes "10⁻ⁿ". In each Example, an aspherical surface is exhibited by the following expression:

$$X(y)=(y^2/r)/[1+[1-(1+\kappa)\times(y^2/r^2)]^{1/2}]+C4\times y^4+C6\times y^6+C8\times y^8+C10\times y^{10}$$

where y denotes a vertical height from the optical axis, $X(y)$ denotes a sag amount which is a distance along the optical axis from the tangent surface at the vertex of the aspherical surface to the aspherical surface at the vertical height y from the optical axis, r denotes a radius of curvature of a reference sphere, κ denotes a conical coefficient, and Cn denotes aspherical coefficient of n-th order.

In [Lens Data] and [Variable Distances], Bf denotes a back focal length. In [Specifications] and [Variable Distances], W, M, and T denote a wide-angle end state, an intermediate focal length state, and a telephoto end state, respectively.

In the tables for various values, "mm" is generally used for the unit of length such as the focal length, the radius of curvature, and the distance to the next lens surface. However, since an optical system proportionally enlarged or reduced its dimension can be obtained similar optical performance, the unit is not necessary to be limited to "mm", and any other suitable unit can be used.

The explanation of reference symbols is the same in the other Examples, so that duplicated explanations are omitted.

TABLE 1

[Specifications]

|  | W | T |
|---|---|---|
| f = | 18.54 | 53.40 |
| FNO = | 3.62 | 5.78 |
| 2ω = | 78.2 | 29.7 |

[Lens Data]

|  | r | d | nd | vd |
|---|---|---|---|---|
| 1 | 120.114 | 2.0 | 1.51680 | 64.12 |
| 2 | 16.936 | 0.1 | 1.55389 | 38.09 |
| 3* | 15.331 | 10.8 |  |  |
| 4 | −83.532 | 1.0 | 1.51823 | 58.89 |
| 5 | 32.979 | 1.2 |  |  |
| 6 | 31.800 | 2.9 | 1.71736 | 29.52 |
| 7 | 97.637 | D1 |  |  |
| 8 | 41.033 | 1.0 | 1.75692 | 31.59 |
| 9 | 18.279 | 3.7 | 1.51860 | 69.89 |
| 10 | −38.345 | 0.1 |  |  |
| 11 | 19.951 | 2.5 | 1.51680 | 64.12 |
| 12 | 60.585 | D2 |  |  |
| 13 | 0.000 | 1.8 | Aperture Stop S | |
| 14 | −37.083 | 2.2 | 1.78472 | 25.68 |
| 15 | −13.729 | 1.0 | 1.71999 | 50.24 |
| 16 | 48.172 | D3 |  |  |
| 17 | −131.460 | 2.9 | 1.51860 | 69.89 |
| 18 | −20.664 | 0.5 |  |  |
| 19 | 78.812 | 4.9 | 1.51823 | 58.89 |
| 20 | −15.343 | 1.0 | 1.75520 | 27.51 |
| 21 | −49.628 | Bf |  |  |

[Aspherical Data]
Surface Number 3

| κ = | −1.0 |
| C4 = | 1.4877E−05 |
| C6 = | 1.9704E−08 |
| C8 = | 4.9476E−12 |
| C10 = | 9.9439E−14 |

TABLE 1-continued

[Variable Distances]

|  | W | M | T |
|---|---|---|---|
| f = | 18.54 | 34.97 | 53.40 |
| D1 = | 29.917 | 9.045 | 2.222 |
| D2 = | 3.487 | 9.501 | 14.075 |
| D3 = | 12.740 | 6.725 | 2.151 |
| Bf = | 38.969 | 51.611 | 66.310 |

[Values for Conditional Expressions]

(1): vd2n = 31.59
(2): nd2n = 1.75692
(3): vd4n = 27.51
(4): nd4n = 1.7552
(5): vd1p = 29.52
(6): nd1p = 1.71736
(7): vd1n = 58.89
(8): nd1n = 1.51823
(9): f2/fw = 1.486
(10): nd3p − nd3n = 0.065

Figure 2B:
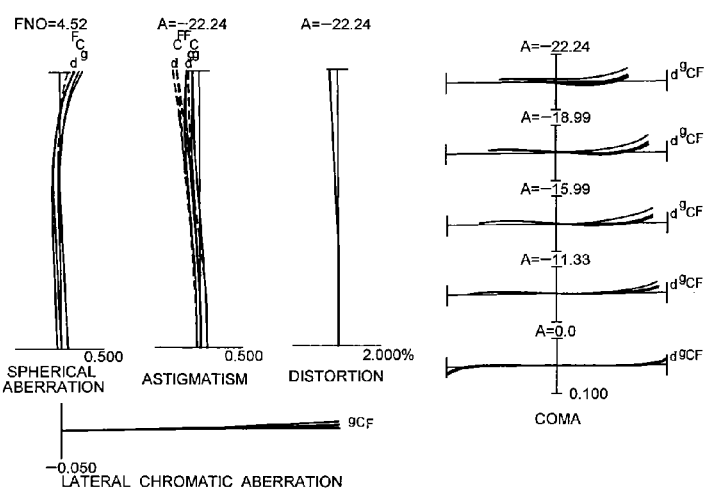
Figure 2C:
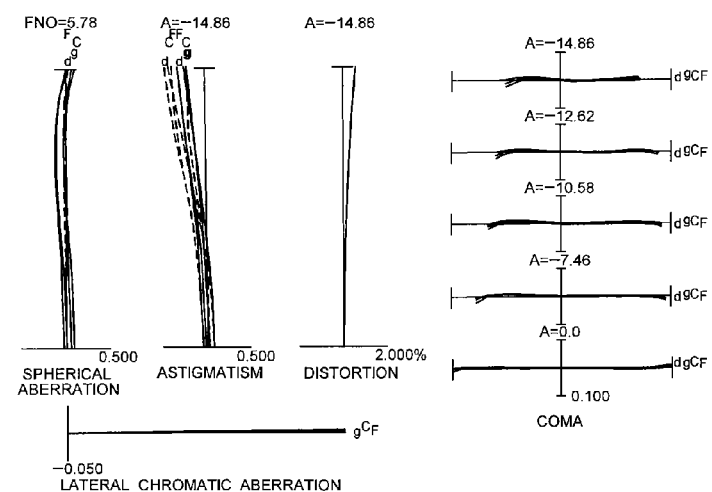

FIGS. 2A, 2B, and 2C are graphs showing various aberrations of the zoom lens system according to Example 1 in which FIG. 2A shows various aberrations in a wide-angle end state, FIG. 2B shows various aberrations in an intermediate focal length state, and FIG. 2C shows various aberrations in a telephoto end state.

In respective graphs, FNO denotes an f-number, A denotes an incident angle of the principal ray, in other words a half angle of view (unit: degree). In graphs showing astigmatism and distortion, the maximum value of a half angle of view A is shown. In respective graphs, d denotes aberration curve at d-line (wavelength λ=587.6 nm), g denotes aberration curve at g-line (wavelength λ=435.8 nm), C denotes aberration curve at C-line (wavelength λ=656.3 nm), and F denotes aberration curve at F-line (wavelength λ=486.1 nm).

In the graphs showing spherical aberration, FNO denotes the f-number with respect to the maximum aperture.

In the graph showing astigmatism, a solid line indicates a sagittal image plane, and a broken line indicates a meridional image plane.

In graphs showing coma, coma with respect to each half angle of view is shown.

The above-described explanation regarding various aberration graphs is the same as the other Examples.

As is apparent from the respective graphs, the zoom lens system according to Example 1 shows superb optical performance as a result of good corrections to various aberrations in the wide-angle end state, in the intermediate focal length state, and in the telephoto end state.

Example 2

FIG. 3 is a diagram showing a lens configuration of a zoom lens system according to Example 2.

The zoom lens system according to Example 2 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, and a cemented negative lens constructed by a double concave negative lens L12 cemented with a double convex positive lens L13.

The second lens group G2 is composed of, in order from the object, a cemented positive lens constructed by a negative meniscus lens L21 having a convex surface facing the object cemented with a double convex positive lens L22, and a positive meniscus lens having a convex surface facing the object.

The third lens group G3 is composed of a cemented negative lens constructed by, in order from the object, a positive meniscus lens L31 having a convex surface facing the image cemented with a double concave negative lens L32.

The fourth lens group G4 is composed of, in order from the object, a positive meniscus lens L41 having a convex surface facing the image, and a cemented positive lens constructed by a double convex positive lens L42 cemented with a negative meniscus lens L43 having a convex surface facing the image.

In the zoom lens system according to Example 2, an aperture stop S is disposed to the object side of the third lens group G3 adjacent thereto, and moved with the third lens group G3 in a body upon zooming from the wide-angle end state to the telephoto end state. A flare stopper FS is disposed to the image side of the fourth lens group G4 adjacent thereto.

In the zoom lens system according to Example 2, upon zooming from the wide-angle end state to the telephoto end state, a distance between the first lens group G1 and the second lens group G2 decreases, a distance between the second lens group G2 and the third lens group G3 increases, and a distance between the third lens group G3 and the fourth lens group G4 decreases.

In the zoom lens system according to Example 2, focusing from infinity to a close object is carried out by moving the first lens group G1 to the object side.

Various values associated with the zoom lens system according to Example 2 are listed in Table 2.

TABLE 2

[Specifications]

|   | W | T |
|---|---|---|
| f = | 18.54 | 53.40 |
| FNO = | 3.62 | 5.78 |
| 2ω = | 78.2 | 29.7 |

[Lens Data]

|   | r | d | nd | vd |
|---|---|---|---|---|
| 1 | 135.000 | 1.5 | 1.51680 | 64.12 |
| 2 | 17.300 | 0.1 | 1.55389 | 38.09 |
| 3* | 14.903 | 12.0 | | |
| 4 | −50.108 | 1.0 | 1.51680 | 64.12 |
| 5 | 68.845 | 2.9 | 1.71736 | 29.52 |
| 6 | −294.198 | D1 | | |
| 7 | 44.807 | 1.5 | 1.71736 | 29.52 |
| 8 | 19.131 | 3.7 | 1.51680 | 64.12 |
| 9 | −56.682 | 0.1 | | |
| 10 | 21.025 | 2.5 | 1.51680 | 64.12 |
| 11 | 218.524 | D2 | | |
| 12 | 0.000 | 1.8 | Aperture Stop S | |
| 13 | −61.923 | 2.0 | 1.80518 | 25.43 |
| 14 | −14.412 | 1.0 | 1.80400 | 46.58 |
| 15 | 38.179 | D3 | | |
| 16 | −350.143 | 2.7 | 1.51680 | 64.12 |
| 17 | −21.244 | 0.1 | | |
| 18 | 68.101 | 4.8 | 1.51680 | 64.12 |
| 19 | −16.293 | 1.0 | 1.75520 | 27.51 |
| 20 | −59.884 | Bf | | |

[Aspherical Data]
Surface Number 3

| κ = | −0.6 |
|---|---|
| C4 = | −5.9986E−07 |
| C6 = | −1.1790E−08 |

TABLE 2-continued

| C8 = | 5.8548E−11 |
|---|---|
| C10 = | −9.8309E−14 |

[Variable Distances]

|   | W | M | T |
|---|---|---|---|
| f = | 18.54 | 35.09 | 53.40 |
| D1 = | 31.049 | 9.706 | 3.291 |
| D2 = | 4.280 | 9.611 | 14.668 |
| D3 = | 12.092 | 6.761 | 1.703 |
| Bf = | 39.188 | 52.550 | 65.160 |

[Values for Conditional Expressions]

(1): vd2n = 29.52
(2): nd2n = 1.71736
(3): vd4n = 27.51
(4): nd4n = 1.7552
(5): vd1p = 29.52
(6): nd1p = 1.71736
(7): vd1n = 64.12
(8): nd1n = 1.5168
(9): f2/fw = 1.488
(10): nd3p − nd3n = 0.001

Figure 4A:
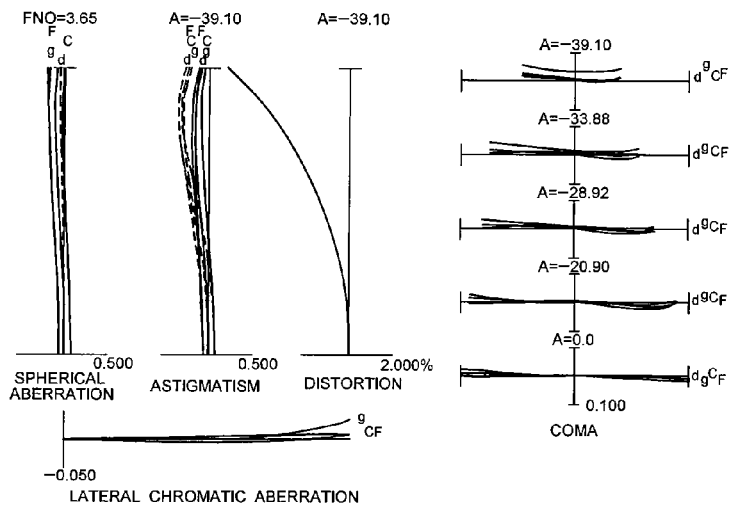
Figure 4B:
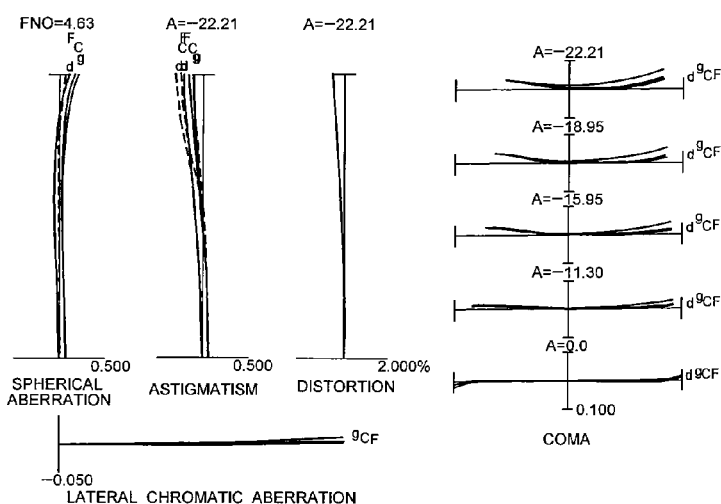
Figure 4C:
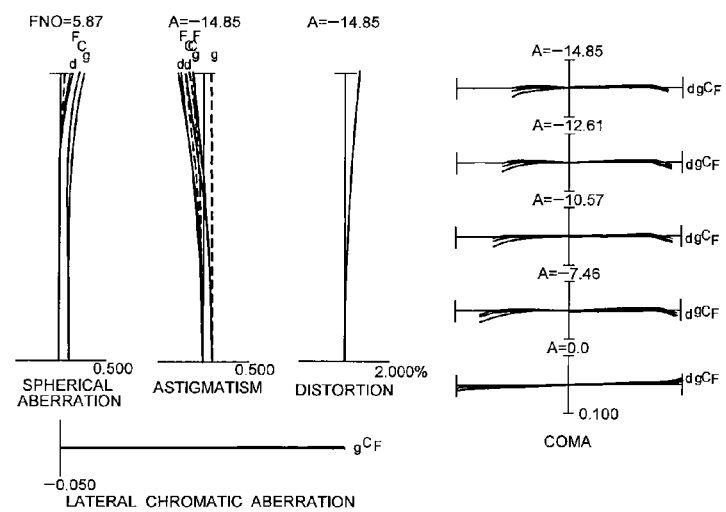

FIGS. 4A, 4B, and 4C are graphs showing various aberrations of the zoom lens system according to Example 2 in which FIG. 4A shows various aberrations in a wide-angle end state, FIG. 4B shows various aberrations in an intermediate focal length state, and FIG. 4C shows various aberrations in a telephoto end state.

As is apparent from the respective graphs, the zoom lens system according to Example 2 shows superb optical performance as a result of good corrections to various aberrations in the wide-angle end state, in the intermediate focal length state, and in the telephoto end state.

Example 3

FIG. 5 is a diagram showing a lens configuration of a zoom lens system according to Example 3.

The zoom lens system according to Example 3 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, and a cemented negative lens constructed by a double concave negative lens L12 cemented with a positive meniscus lens L13 having a convex surface facing the object.

The second lens group G2 is composed of, in order from the object, a double convex positive lens L21, and a cemented positive lens constructed by a double convex positive lens L22 cemented with a double concave negative lens L23.

The third lens group G3 is composed of a cemented negative lens constructed by, in order from the object, a positive meniscus lens L31 having a convex surface facing the image cemented with a double concave negative lens L32.

The fourth lens group G4 is composed of, in order from the object, a positive meniscus lens L41 having a convex surface facing the image, and a cemented positive lens constructed by a double convex positive lens L42 cemented with a negative meniscus lens L43 having a convex surface facing the image.

In the zoom lens system according to Example 3, an aperture stop S is disposed to the object side of the third lens group G3 adjacent thereto, and moved with the third lens group G3 in a body upon zooming from the wide-angle end state to the telephoto end state. A flare stopper FS is disposed to the image side of the fourth lens group G4 adjacent thereto.

In the zoom lens system according to Example 3, upon zooming from the wide-angle end state to the telephoto end state, a distance between the first lens group G1 and the second lens group G2 decreases, a distance between the second lens group G2 and the third lens group G3 increases, and a distance between the third lens group G3 and the fourth lens group G4 decreases.

In the zoom lens system according to Example 3, focusing from infinity to a close object is carried out by moving the first lens group G1 to the object side.

Various values associated with the zoom lens system according to Example 3 are listed in Table 3.

TABLE 3

[Specifications]

|  | W | T |
|---|---|---|
| f = | 18.54 | 53.40 |
| FNO = | 3.62 | 5.78 |
| 2ω = | 78.2 | 29.7 |

[Lens Data]

|  | r | d | nd | vd |
|---|---|---|---|---|
| 1 | 80.437 | 1.5 | 1.51680 | 64.12 |
| 2 | 17.205 | 0.1 | 1.55389 | 38.09 |
| 3* | 15.012 | 10.8 |  |  |
| 4 | −60.085 | 1.0 | 1.51680 | 64.12 |
| 5 | 30.716 | 3.0 | 1.71736 | 29.52 |
| 6 | 152.832 | D1 |  |  |
| 7 | 46.938 | 2.5 | 1.51680 | 64.12 |
| 8 | −50.104 | 0.2 |  |  |
| 9 | 23.342 | 3.6 | 1.51680 | 64.12 |
| 10 | −36.867 | 1.5 | 1.75520 | 27.51 |
| 11 | 1555.847 | D2 |  |  |
| 12 | 0.000 | 1.8 | Aperture Stop S |  |
| 13 | −47.357 | 2.0 | 1.74950 | 35.04 |
| 14 | −11.884 | 1.0 | 1.71999 | 50.24 |
| 15 | 37.372 | D3 |  |  |
| 16 | −243.758 | 2.7 | 1.51680 | 64.12 |
| 17 | −23.094 | 0.1 |  |  |
| 18 | 65.009 | 4.8 | 1.51680 | 64.12 |
| 19 | −15.997 | 1.0 | 1.74950 | 35.04 |
| 20 | −52.132 | Bf |  |  |

[Aspherical Data]
Surface Number 3

| κ = | −1.0 |
| C4 = | 1.7921E−05 |
| C6 = | 2.5696E−08 |
| C8 = | −1.1686E−12 |
| C10 = | 1.8642E−13 |

[Variable Distances]

|  | W | M | T |
|---|---|---|---|
| f = | 18.54 | 35.11 | 53.40 |
| D1 = | 34.178 | 12.471 | 5.531 |
| D2 = | 2.470 | 7.827 | 12.067 |
| D3 = | 12.113 | 6.756 | 2.517 |
| Bf = | 37.628 | 50.745 | 65.109 |

[Values for Conditional Expressions]

(1): vd2n = 27.51
(2): nd2n = 1.7552
(3): vd4n = 35.04
(4): nd4n = 1.7495
(5): vd1p = 29.52

TABLE 3-continued (6): nd1p = 1.71736
(7): vd1n = 64.12
(8): nd1n = 1.5168
(9): f2/fw = 1.469
(10): nd3p − nd3n = 0.030

Figure 6A:
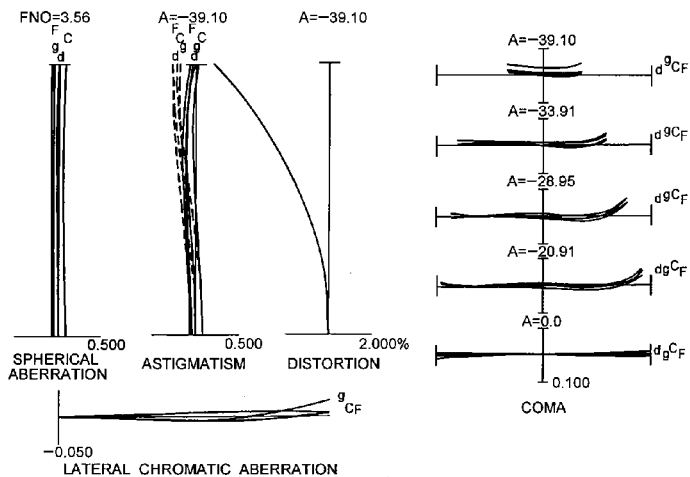
Figure 6B:
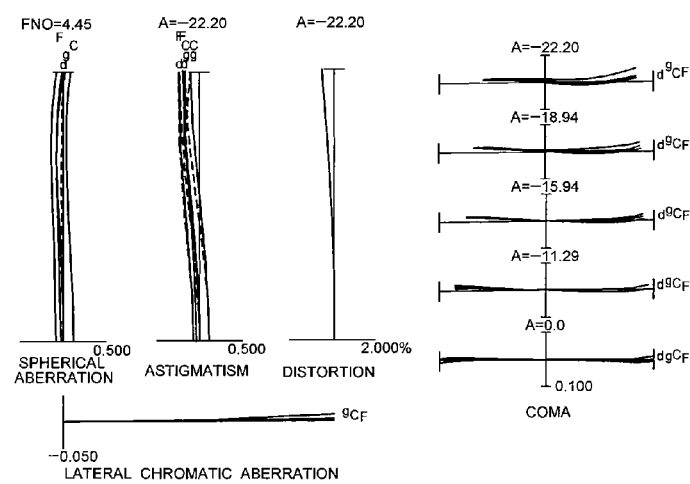
Figure 6C:
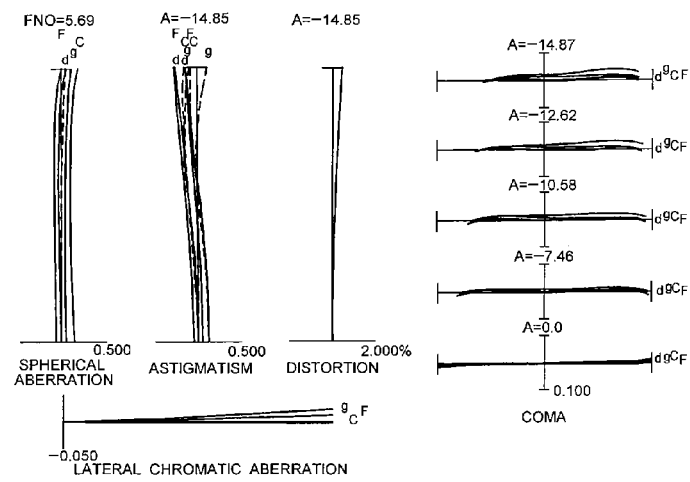

FIGS. 6A, 6B, and 6C are graphs showing various aberrations of the zoom lens system according to Example 3 in which FIG. 6A shows various aberrations in a wide-angle end state, FIG. 6B shows various aberrations in an intermediate focal length state, and FIG. 6C shows various aberrations in a telephoto end state.

As is apparent from the respective graphs, the zoom lens system according to Example 3 shows superb optical performance as a result of good corrections to various aberrations in the wide-angle end state, in the intermediate focal length state, and in the telephoto end state.

Example 4

FIG. 7 is a diagram showing a lens configuration of a zoom lens system according to Example 4.

The zoom lens system according to Example 4 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object.

The second lens group G2 is composed of, in order from the object, a cemented positive lens constructed by a negative meniscus lens L21 having a convex surface facing the object cemented with a double convex positive lens L22, and a positive meniscus lens L23 having a convex surface facing the object.

The third lens group G3 is composed of a cemented negative lens constructed by, in order from the object, a positive meniscus lens L31 having a convex surface facing the image cemented with a double concave negative lens L32.

The fourth lens group G4 is composed of, in order from the object, a positive meniscus lens L41 having a convex surface facing the image, and a cemented positive lens constructed by a double convex positive lens L42 cemented with a negative meniscus lens L43 having a convex surface facing the image.

In the zoom lens system according to Example 4, an aperture stop S is disposed to the object side of the third lens group G3 adjacent thereto, and moved with the third lens group G3 in a body upon zooming from the wide-angle end state to the telephoto end state. A flare stopper FS is disposed to the image side of the fourth lens group G4 adjacent thereto.

In the zoom lens system according to Example 4, upon zooming from the wide-angle end state to the telephoto end state, a distance between the first lens group G1 and the second lens group G2 decreases, a distance between the second lens group G2 and the third lens group G3 increases, and a distance between the third lens group G3 and the fourth lens group G4 decreases.

In the zoom lens system according to Example 4, focusing from infinity to a close object is carried out by moving the first lens group G1 to the object side.

Various values associated with the zoom lens system according to Example 4 are listed in Table 4.

TABLE 4

[Specifications]

|  | W | T |
|---|---|---|
| f = | 18.54 | 53.40 |
| FNO = | 3.62 | 5.78 |
| 2ω = | 78.2 | 29.7 |

[Lens Data]

|  | r | d | nd | vd |
|---|---|---|---|---|
| 1 | 126.484 | 1.9 | 1.51680 | 64.12 |
| 2 | 16.600 | 0.15 | 1.55389 | 38.09 |
| 3* | 14.825 | 10.1 | | |
| 4 | −112.632 | 1.3 | 1.51680 | 64.12 |
| 5 | 33.442 | 1.2 | | |
| 6 | 30.217 | 2.9 | 1.71736 | 29.52 |
| 7 | 78.165 | D1 | | |
| 8 | 35.638 | 1.0 | 1.75520 | 27.51 |
| 9 | 17.633 | 4.1 | 1.51680 | 64.12 |
| 10 | −45.157 | 0.1 | | |
| 11 | 21.687 | 2.2 | 1.51680 | 64.12 |
| 12 | 82.472 | D2 | | |
| 13 | 0.000 | 1.8 | Aperture Stop S | |
| 14 | −39.396 | 2.1 | 1.78472 | 25.68 |
| 15 | −13.917 | 1.0 | 1.71999 | 50.24 |
| 16 | 45.536 | D3 | | |
| 17 | −104.847 | 2.8 | 1.51680 | 64.12 |
| 18 | −20.902 | 0.1 | | |
| 19 | 71.133 | 5.4 | 1.51680 | 64.12 |
| 20 | −15.270 | 1.0 | 1.72825 | 28.46 |
| 21 | −51.354 | Bf | | |

[Aspherical Data]
Surface Number 3

| κ = | −1.0 |
|---|---|
| C4 = | 1.6242E−05 |
| C6 = | 3.2405E−08 |
| C8 = | −3.8830E−11 |
| C10 = | 2.2801E−13 |

[Variable Distances]

|  | W | M | T |
|---|---|---|---|
| f = | 18.54 | 34.98 | 53.40 |
| D1 = | 29.667 | 8.795 | 1.972 |
| D2 = | 3.387 | 9.401 | 13.975 |
| D3 = | 12.840 | 6.825 | 2.251 |
| Bf = | 38.968 | 51.613 | 66.311 |

[Values for Conditional Expressions]

(1): vd2n = 27.51
(2): nd2n = 1.7552
(3): vd4n = 28.46
(4): nd4n = 1.72825
(5): vd1p = 29.52
(6): nd1p = 1.71736
(7): vd1n = 64.12
(8): nd1n = 1.5168
(9): f2/fw = 1.489
(10): nd3p − nd3n = 0.065

Figure 8A:
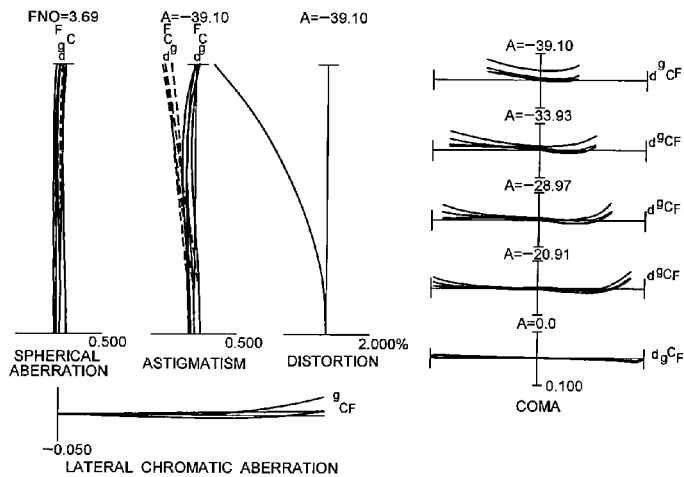
Figure 8B:
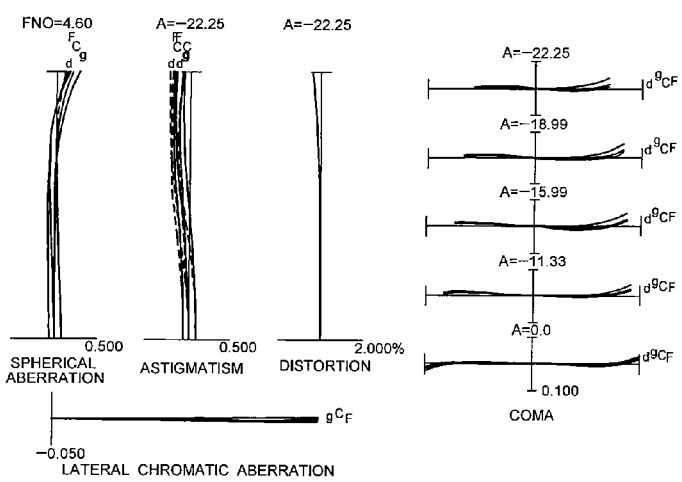
Figure 8C:
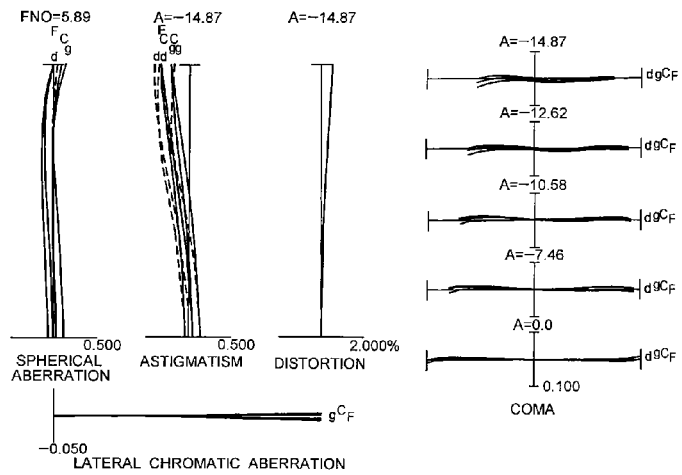

FIGS. 8A, 8B, and 8C are graphs showing various aberrations of the zoom lens system according to Example 4 in which FIG. 8A shows various aberrations in a wide-angle end state, FIG. 8B shows various aberrations in an intermediate focal length state, and FIG. 8C shows various aberrations in a telephoto end state.

As is apparent from the respective graphs, the zoom lens system according to Example 4 shows superb optical performance as a result of good corrections to various aberrations in the wide-angle end state, in the intermediate focal length state, and in the telephoto end state.

Example 5

Figure 9:
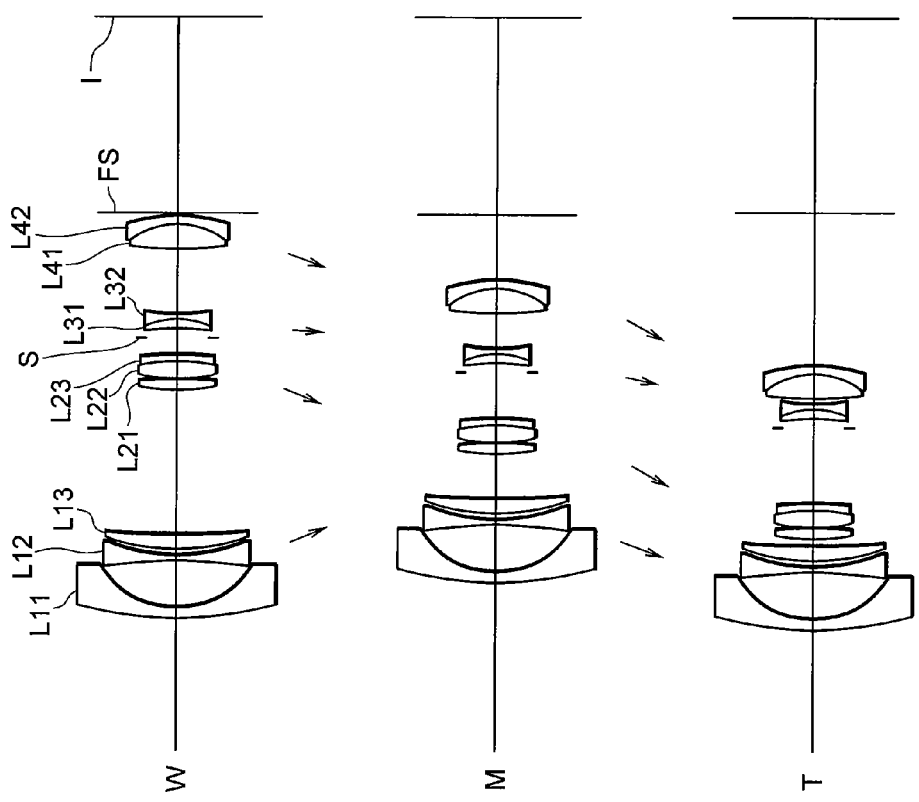
FIG. 9 is a diagram showing a lens configuration of a zoom lens system according to Example 5.

FIG. 9 is a diagram showing a lens configuration of a zoom lens system according to Example 5.

The zoom lens system according to Example 5 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object.

The second lens group G2 is composed of, in order from the object, a double convex positive lens L21, and a cemented positive lens constructed by a double convex positive lens L22 cemented with a negative meniscus lens L23 having a convex surface facing the image.

The third lens group G3 is composed of a cemented negative lens constructed by, in order from the object, a positive meniscus lens L31 having a convex surface facing the image cemented with a double concave negative lens L32.

The fourth lens group G4 is composed of a cemented positive lens constructed by, in order from the object, a double convex positive lens L41 cemented with a negative meniscus lens L42 having a convex surface facing the image.

In the zoom lens system according to Example 5, an aperture stop S is disposed to the object side of the third lens group G3 adjacent thereto, and moved with the third lens group G3 in a body upon zooming from the wide-angle end state to the telephoto end state. A flare stopper FS is disposed to the image side of the fourth lens group G4 adjacent thereto.

In the zoom lens system according to Example 5, upon zooming from the wide-angle end state to the telephoto end state, a distance between the first lens group G1 and the second lens group G2 decreases, a distance between the second lens group G2 and the third lens group G3 increases, and a distance between the third lens group G3 and the fourth lens group G4 decreases.

In the zoom lens system according to Example 5, focusing from infinity to a close object is carried out by moving the first lens group G1 to the object side.

Various values associated with the zoom lens system according to Example 5 are listed in Table 5.

TABLE 5

[Specifications]

|  | W | T |
|---|---|---|
| f = | 19.00 | 54.00 |
| FNO = | 3.55 | 5.97 |
| 2ω = | 75.1 | 29.5 |

[Lens Data]

|  | r | d | nd | vd |
|---|---|---|---|---|
| 1 | 77.000 | 1.7 | 1.51680 | 64.12 |
| 2 | 17.200 | 0.1 | 1.55389 | 38.09 |
| 3* | 14.913 | 9.5 | | |
| 4 | −75.005 | 1.0 | 1.51680 | 64.12 |

TABLE 5-continued

| | | | | |
|---|---|---|---|---|
| 5 | 40.043 | 1.0 | | |
| 6 | 41.498 | 2.9 | 1.78470 | 26.3 |
| 7 | 154.449 | D1 | | |
| 8 | 35.421 | 2.0 | 1.51680 | 64.12 |
| 9 | −112.618 | 0.1 | | |
| 10 | 29.412 | 3.5 | 1.51680 | 64.12 |
| 11 | −30.782 | 1.0 | 1.71736 | 29.52 |
| 12 | −346.892 | D2 | | |
| 13 | 0.000 | 1.8 | Aperture Stop S | |
| 14 | −53.525 | 2.0 | 1.80100 | 34.96 |
| 15 | −11.753 | 1.0 | 1.77250 | 49.61 |
| 16 | 59.450 | D3 | | |
| 17* | 67.189 | 0.07 | 1.55389 | 38.09 |
| 18 | 67.000 | 5.5 | 1.60311 | 60.68 |
| 19 | −13.690 | 1.5 | 1.78472 | 25.68 |
| 20 | −23.356 | Bf | | |

[Aspherical Data]

Surface Number 3

κ = −1.0
C4 = 1.7453E−05
C6 = 1.2299E−08
C8 = −1.6304E−11
C10 = 9.8357E−14

Surface Number 17

κ = 36.2019
C4 = −2.9653E−05
C6 = −1.3243E−07
C8 = 1.1100E−09
C10 = −1.3060E−11

[Variable Distances]

| | W | M | T |
|---|---|---|---|
| f = | 19.00 | 33.91 | 54.00 |
| d1 = | 28.742 | 9.045 | 1.722 |
| d2 = | 3.640 | 9.501 | 15.335 |
| d3 = | 12.587 | 6.725 | 0.892 |
| Bf = | 39.365 | 52.108 | 68.997 |

[Values for Conditional Expressions]

(1): vd2n = 29.52
(2): nd2n = 1.71736
(3): vd4n = 25.68
(4): nd4n = 1.78472
(5): vd1p = 26.3
(6): nd1p = 1.7847
(7): vd1n = 64.12
(8): nd1n = 1.5168
(9): f2/fw = 1.631
(10): nd3p − nd3n = 0.029

Figure 10A:
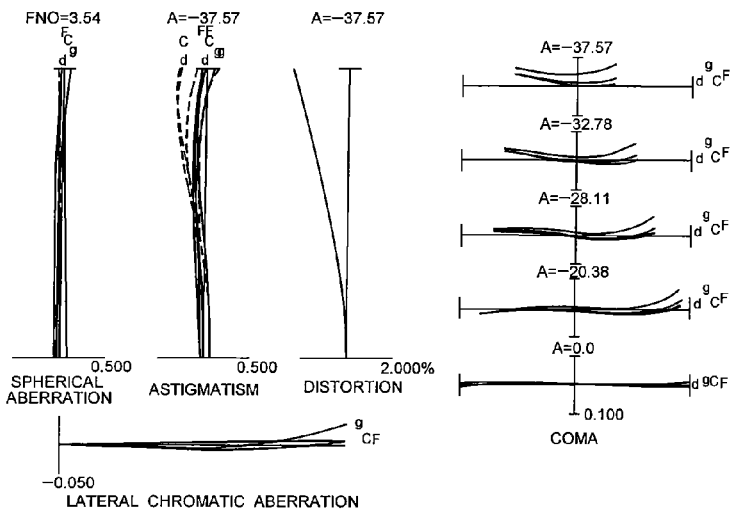
Figure 10B:
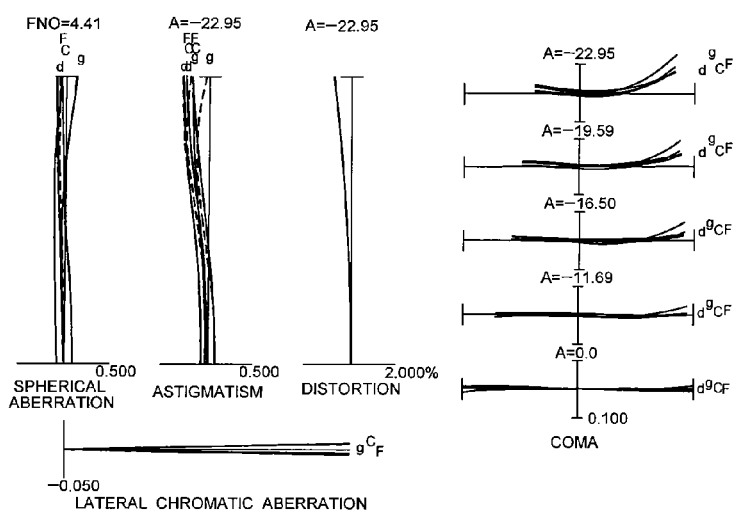
Figure 10C:
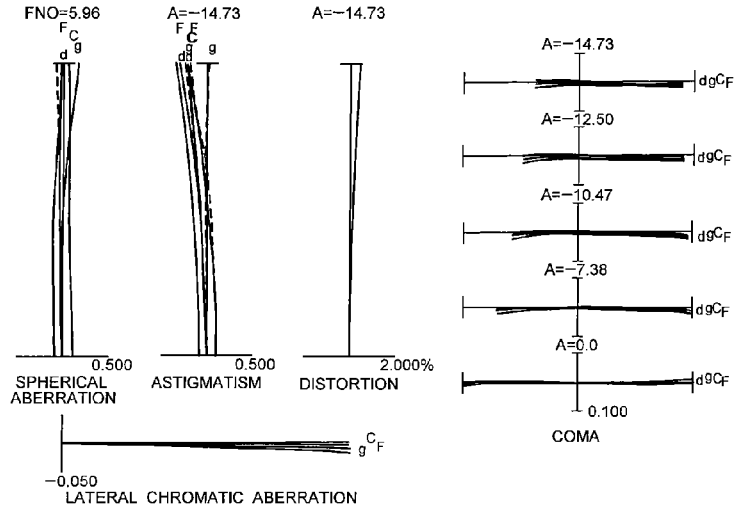

FIGS. 10A, 10B, and 10C are graphs showing various aberrations of the zoom lens system according to Example 5 in which FIG. 10A shows various aberrations in a wide-angle end state, FIG. 10B shows various aberrations in an intermediate focal length state, and FIG. 10C shows various aberrations in a telephoto end state.

As is apparent from the respective graphs, the zoom lens system according to Example 5 shows superb optical performance as a result of good corrections to various aberrations in the wide-angle end state, in the intermediate focal length state, and in the telephoto end state.

Example 6

Figure 11:
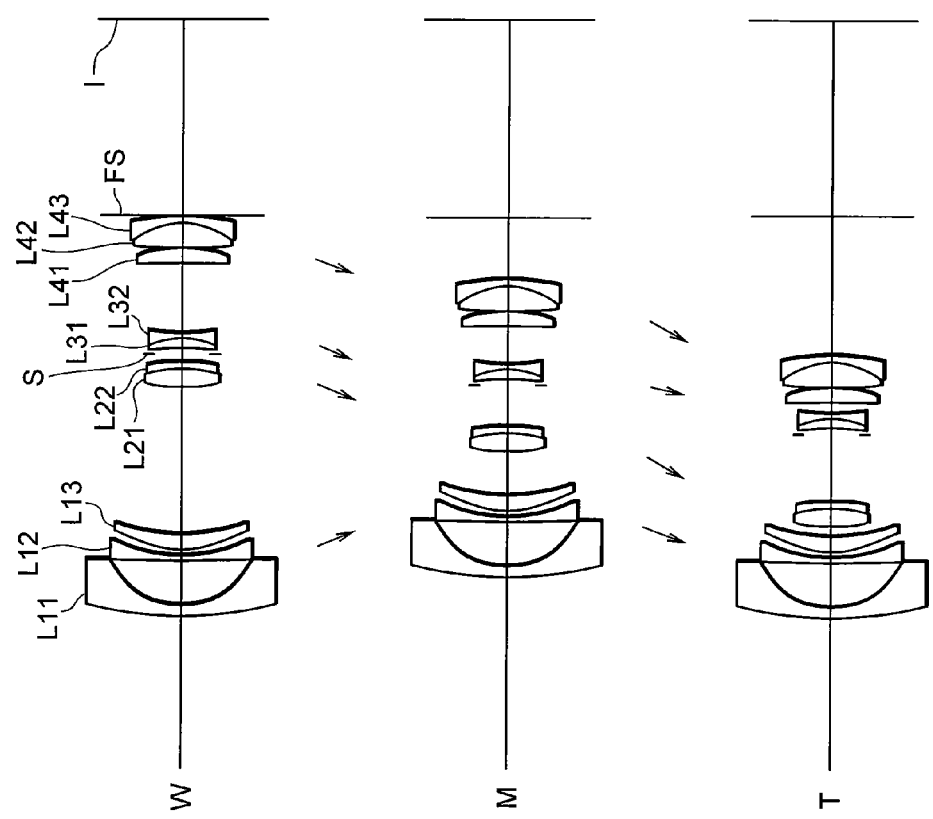
FIG. 11 is a diagram showing a lens configuration of a zoom lens system according to Example 6.

FIG. 11 is a diagram showing a lens configuration of a zoom lens system according to Example 6.

The zoom lens system according to Example 6 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a negative meniscus lens L12 having a convex surface facing the object, and a positive meniscus lens L13 having a convex surface facing the object.

The second lens group G2 is composed of a cemented positive lens constructed by, in order from the object, a double convex positive lens L21 cemented with a negative meniscus lens L22 having a convex surface facing the image.

The third lens group G3 is composed of a cemented negative lens constructed by, in order from the object, a positive meniscus lens L31 having a convex surface facing the image cemented with a double concave negative lens L32.

The fourth lens group G4 is composed of, in order from the object, a positive meniscus lens L41 having a convex surface facing the image, and a cemented positive lens constructed by a double convex positive lens L42 cemented with a negative meniscus lens L43 having a convex surface facing the image.

In the zoom lens system according to Example 6, an aperture stop S is disposed to the object side of the third lens group G3 adjacent thereto, and moved with the third lens group G3 in a body upon zooming from the wide-angle end state to the telephoto end state. A flare stopper FS is disposed to the image side of the fourth lens group G4 adjacent thereto.

In the zoom lens system according to Example 6, upon zooming from the wide-angle end state to the telephoto end state, a distance between the first lens group G1 and the second lens group G2 decreases, a distance between the second lens group G2 and the third lens group G3 increases, and a distance between the third lens group G3 and the fourth lens group G4 decreases.

In the zoom lens system according to Example 6, focusing from infinity to a close object is carried out by moving the first lens group G1 to the object side.

Various values associated with the zoom lens system according to Example 6 are listed in Table 6.

TABLE 6

[Specifications]

| | W | T |
|---|---|---|
| f = | 18.50 | 53.40 |
| FNO = | 3.65 | 5.91 |
| 2ω = | 77.5 | 29.9 |

[Lens Data]

| | r | d | nd | vd |
|---|---|---|---|---|
| 1 | 85.011 | 2.0 | 1.51680 | 64.12 |
| 2 | 16.000 | 0.1 | 1.55389 | 38.09 |
| 3* | 13.602 | 8.4 | | |
| 4 | 292.137 | 1.0 | 1.51680 | 64.12 |
| 5 | 30.436 | 1.2 | | |
| 6 | 24.214 | 2.9 | 1.78472 | 25.68 |
| 7 | 39.056 | D1 | | |
| 8* | 22.229 | 4.0 | 1.58913 | 61.18 |
| 9 | −22.229 | 1.0 | 1.78472 | 25.68 |
| 10 | −46.548 | D2 | | |
| 11 | 0.000 | 1.0 | Aperture Stop S | |
| 12 | −53.270 | 2.0 | 1.79504 | 28.69 |
| 13 | −17.938 | 0.9 | 1.71999 | 50.24 |
| 14 | 49.018 | D3 | | |
| 15 | −326.255 | 2.9 | 1.51680 | 64.12 |
| 16 | −23.868 | 0.1 | | |
| 17 | 72.921 | 4.9 | 1.51680 | 64.12 |
| 18 | −14.233 | 1.0 | 1.64769 | 33.79 |
| 19 | −65.879 | Bf | | |

TABLE 6-continued

[Aspherical Data]

Surface Number 3

| | |
|---|---|
| κ = | −1.0 |
| C4 = | 2.3525E−05 |
| C6 = | 3.5515E−08 |
| C8 = | 1.1918E−11 |
| C10 = | 2.1618E−13 |

Surface Number 8

| | |
|---|---|
| κ = | −1.0 |
| C4 = | −3.4451E−06 |
| C6 = | −1.1120E−08 |
| C8 = | −5.4552E−11 |
| C10 = | −1.3487E−13 |

[Variable Distances]

| | W | M | T |
|---|---|---|---|
| f = | 18.50 | 34.97 | 53.40 |
| d1 = | 28.375 | 8.244 | 1.722 |
| d2 = | 1.683 | 8.198 | 13.271 |
| d3 = | 13.736 | 7.162 | 2.148 |
| Bf = | 38.620 | 51.235 | 65.959 |

[Values for Conditional Expressions]

(1): vd2n = 25.68
(2): nd2n = 1.78472
(3): vd4n = 33.79
(4): nd4n = 1.64769
(5): vd1p = 25.68
(6): nd1p = 1.78472
(7): vd1n = 64.12
(8): nd1n = 1.5168
(9): f2/fw = 1.597
(10): nd3p − nd3n = 0.075

Figure 12A:
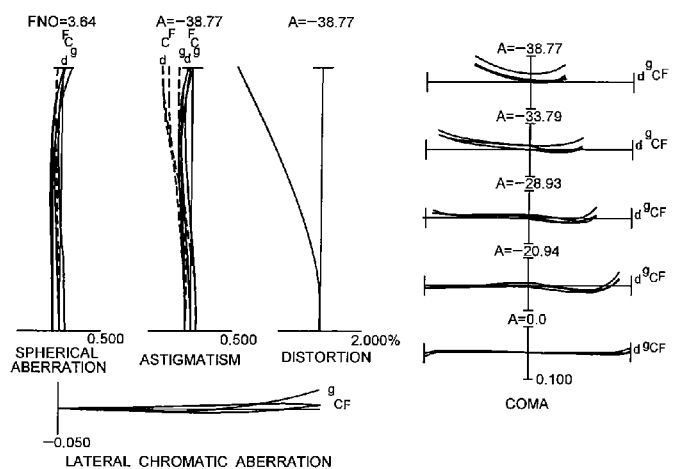
Figure 12B:
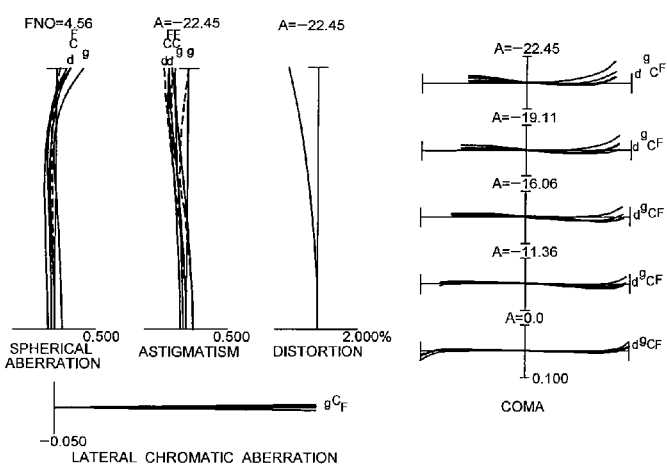
Figure 12C:
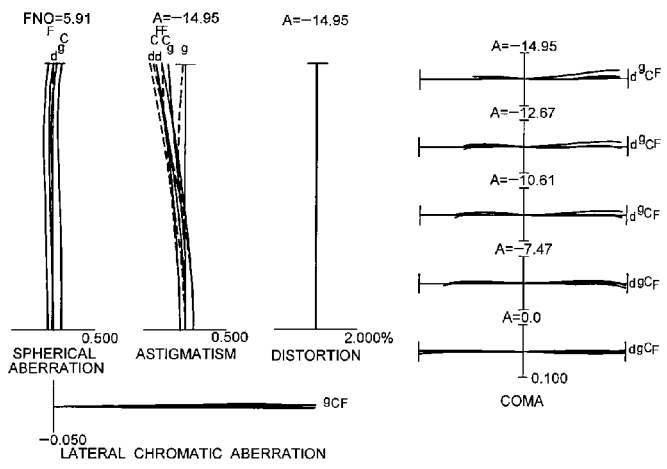

FIGS. 12A, 12B, and 12C are graphs showing various aberrations of the zoom lens system according to Example 6 in which FIG. 12A shows various aberrations in a wide-angle end state, FIG. 12B shows various aberrations in an intermediate focal length state, and FIG. 12C shows various aberrations in a telephoto end state.

As is apparent from the respective graphs, the zoom lens system according to Example 6 shows superb optical performance as a result of good corrections to various aberrations in the wide-angle end state, in the intermediate focal length state, and in the telephoto end state.

As described above, each example makes it possible to provide a zoom lens system that is inexpensive, compact and lightweight with high optical performance.

Although a zoom lens system with a four-lens-group configuration is shown as each Example of the present application, the lens-group configuration according to the present application is not limited to this, and is applicable to other lens-group configurations such as a five-lens-group configuration.

In the zoom lens system according to the present application, in order to carry out focusing from infinity to a close object, a portion of a lens group, a single lens group, or a plurality of lens groups may be moved along the optical axis. The focusing lens group(s) may be used for auto focus, and suitable for being driven by a motor such as an ultrasonic motor. In the zoom lens system according to each Example, it is preferable that the first lens group is used for the focusing lens group.

In the zoom lens system according to the present application, in order to correct an image blur caused by a camera shake, a portion of a lens group, or a single lens group may be moved as a vibration reduction lens group in a direction perpendicular to the optical axis. In a zoom lens system according to the present application, it is preferable that the third lens group or a portion of the third lens group is used for the vibration reduction lens group.

Any lens surface composing the zoom lens system according to the present application may be an aspherical surface. The aspherical surface may be fabricated by a fine grinding process, a glass molding process that a glass material is formed into an aspherical shape by a mold, or a compound type process that a resin material is formed into an aspherical shape on a glass surface.

In the zoom lens system according to the present application, an antireflection coating having high transmittance over a broad wavelength range may be applied to each lens surface to reduce flare or ghost images, so that high optical performance with high contrast can be attained.

The above-described each example of the present application only shows a specific example, so that the present application is not limited to this.

Then, a camera equipped with a zoom lens system according to the present application is explained with reference to FIG. 13.

Figure 13:
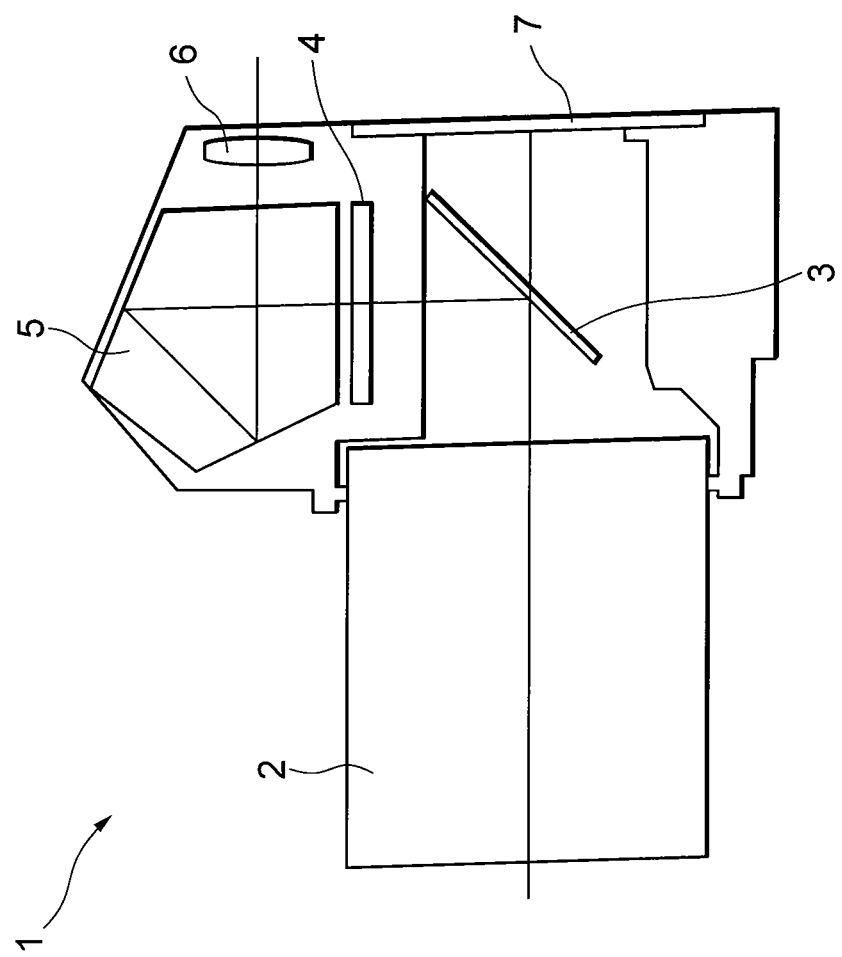
FIG. 13 is a schematic diagram showing a camera equipped with the zoom lens system according to EXAMPLE 1.

FIG. 13 is a schematic diagram showing a configuration of a camera using the zoom lens system according to Examples 1.

As shown in FIG. 13, the camera 1 is a single-lens reflex digital camera equipped with the zoom lens system according to Example 1 as an image-taking lens 2.

In the camera 1, light emitted from a subject (not shown) is converged by an image-taking lens 2, and focused on a focusing screen 4 through a quick return mirror 3. The subject image focused on the focusing screen 4 is reflected a plurality of times by a pentagonal roof prism 5, and led to an eyepiece 6. Therefore, a photographer can observe the subject image as an erected image through the eyepiece 6.

When the photographer presses a shutter release button (not shown), the quick return mirror 3 is removed from an optical path, and the light from the subject (not shown) reaches an imaging device 7. The light from the subject is captured by the imaging device 7 and stored in a memory (not shown) as a subject image. In this manner, the photographer can take a picture of the subject by the camera 1.

The zoom lens system according to Example 1 of the first embodiment attached to the camera 1 as an image-taking lens 2 makes it possible to realize to be inexpensive, compact and lightweight with high optical performance. Accordingly, the camera 1 makes it possible to realize to be inexpensive, compact and lightweight with high optical performance.

The present application is not limited to this, and it is needless to say that the similar effect can be obtained by a camera equipped with the zoom lens system according to any one of Examples 2 through 6 of the present application.

As described above, the present application makes it possible to realize a zoom lens system being inexpensive, compact and lightweight with high optical performance, an imaging apparatus, and a method for varying a focal length the zoom lens system.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object side:
a first lens group having negative refractive power;
a second lens group having positive refractive power;
a third lens group having negative refractive power; and a fourth lens group having positive refractive power;

upon varying a focal length from a wide-angle end state to a telephoto end state, a distance between the first lens group and the second lens group decreasing, a distance between the second lens group and the third lens group increasing, and a distance between the third lens group and the fourth lens group decreasing;

the second lens group consisting of two positive lenses or less and one negative lens;

the fourth lens group consisting of two positive lenses or less and one negative lens;

the following conditional expressions being satisfied:

$$25 \leq vd2n \leq 40$$

when $25 \leq vd2n \leq 30$ $$-0.035 \times vd2n + 2.63 \leq nd2n \leq 1.79$$

when $30 < vd2n \leq 35$ $$1.58 < nd2n \leq 1.79$$

when $35 < vd2n \leq 40$ $$1.58 < nd2n \leq -0.034 \times vd2n + 2.98$$

where vd2n denotes Abbe number of the negative lens in the second lens group at d-line, which has a wavelength λ=587.6 nm, and nd2n denotes a refractive index of the negative lens in the second lens group at d-line; and the following conditional expressions being satisfied:

$$25 \leq vd4n \leq 40$$

when $25 \leq vd4n \leq 30$ $$-0.035 \times vd4n + 2.63 \leq nd4n \leq 1.79$$

when $30 < vd4n \leq 35$ $$1.58 < nd4n \leq 1.79$$

when $35 < vd4n \leq 40$ $$1.58 < nd4n \leq 0.034 \times vd4n + 2.98$$

where vd4n denotes Abbe number of the negative lens in the fourth lens group at d-line, and nd4n denotes a refractive index of the negative lens in the fourth lens group at d-line.

2. The zoom lens system according to claim 1, wherein the first lens group includes a positive lens, and the following conditional expressions are satisfied:

$$25 \leq vd1p \leq 40$$

when $25 \leq vd1p \leq 30$ $$-0.035 \times vd1p + 2.63 \leq nd1p \leq 1.79$$

when $30 < vd1p \leq 35$ $$1.58 < nd1p \leq 1.79$$

when $35 < vd1p \leq 40$ $$1.58 < nd1p \leq -0.034 \times vd1p + 2.98$$

where vd1p denotes Abbe number of the positive lens in the first lens group at d-line, which has a wavelength λ=587.6 nm, nd1p denotes a refractive index of the positive lens in the first lens group at d-line.

3. The zoom lens system according to claim 2, wherein the first lens group includes a negative lens and the following conditional expressions are satisfied:

$$30 \leq vd1n \leq 71$$

when $30 \leq vd1n 36$ $$-0.013 \times vd1n + 2.083 < nd1n \leq 1.7$$

when $36 < vd1n \leq 41$ $$-0.013 \times vd1n + 2.083 < nd1n \leq -0.004 \times vd1n + 1.844$$

when $41 < vd1n \leq 51$ $$-0.004 \times vd1n + 1.714 < nd1n - 0.004 \times vd1n 0.844$$

when $51 < vd1n \leq 61$ $$-0.0015 \times vd1n + 1.5865 < nd1n \leq -0.004 \times vd1n + 1.844$$

when $61 < vd1n \leq 71$ $$-0.0015 \times vd1n + 1.5865 < nd1n \leq -0.009 \times vd1n + 2.149$$

where vd1n denotes Abbe number of the negative lens in the first lens group at d-line, which has a wavelength λ=587.6 nm, nd1n denotes a refractive index of the negative lens in the first lens group at d-line.

4. The zoom lens system according to claim 3, wherein the following conditional expression is satisfied:

$$1.2 < f2/fw < 2.0$$

where f2 denotes a focal length of the second lens group, and fw denotes a focal length of the zoom lens system in the wide-angle end state.

5. The zoom lens system according to claim 1, wherein the first lens group includes a negative lens and the following conditional expressions are satisfied:

$$30 \leq vd1n \leq 71$$

when $30 \leq vd1n \leq 36$ $$-0.013 \times vd1n + 2.083 \leq nd1n \leq 1.7$$

when $36 < vd1n \leq 41$ $$-0.013 \times vd1n + 2.083 < nd1n - 0.004 \times vd1n + 1.844$$

when $41 < vd1n \leq 51$ $$-0.004 \times vd1n + 1.714 < nd1n \leq -0.004 \times vd1n + 1.844$$

when $51 < vd1n \leq 61$ $$-0.0015 \times vd1n + 1.5865 < nd1n \leq -0.004 \times vd1n + 1.844$$

when $61 < vd1n \leq 71$ $$-0.0015 \times vd1n + 1.5865 < nd1p \leq -0.009 \times vd1n + 2.149$$

where vd1n denotes Abbe number of the negative lens in the first lens group at d-line, which has a wavelength λ=587.6 nm, nd1n denotes a refractive index of the negative lens in the first lens group at d-line.

6. The zoom lens system according to claim 1, wherein the following conditional expression is satisfied:

$$1.2 < f2/fw < 2.0$$

where f2 denotes a focal length of the second lens group, and fw denotes a focal length of the zoom lens system in the wide-angle end state.

7. The zoom lens system according to claim 1, wherein the first lens group has at least one aspherical lens.

8. The zoom lens system according to claim 1, wherein the first lens group consists of two negative lenses and one positive lens.

9. The zoom lens system according to claim 1, wherein the second lens group and the fourth lens group are moved in a body upon varying a focal length from the wide-angle end state to the telephoto end state.

10. The zoom lens system according to claim 1, wherein the third lens group consists of a cemented negative lens constructed by a positive lens cemented with a negative lens, and the following conditional expression is satisfied:

$$-0.1 < nd3p - nd3n < 0.1$$

where nd3p denotes the refractive index of the positive lens in the third lens group at d-line, which has a wavelength $\lambda=587.6$ nm, and nd3n denotes the refractive index of the negative lens in the third lens group at d-line.

11. The zoom lens system according to claim 1, wherein an aperture is disposed to the object side of the third lens group adjacent thereto.

12. An imaging apparatus including a zoom lens system, the zoom lens system comprising, in order from an object side:

a first lens group having negative refractive power;

a second lens group having positive refractive power;

a third lens group having negative refractive power; and a fourth lens group having positive refractive power;

upon varying a focal length from a wide-angle end state to a telephoto end state, a distance between the first lens group and the second lens group decreasing, a distance between the second lens group and the third lens group increasing, and a distance between the third lens group and the fourth lens group decreasing;

the second lens group consisting of two positive lenses or less and one negative lens;

the fourth lens group consisting of two positive lenses or less and one negative lens;

the following conditional expressions being satisfied:

$$25 \leq vd2n \leq 40$$

when $25 \leq vd2n \leq 30$ $$-0.035 \times vd2n + 2.63 \leq nd2n \leq 1.79$$

when $30 < vd2n \leq 35$ $$1.58 < nd2n \leq 1.79$$

when $35 < vd2n \leq 40$ $$1.58 < nd2n \leq -0.034 \times vd2n + 2.98$$

where vd2n denotes Abbe number of the negative lens in the second lens group at d-line, which has a wavelength $\lambda=587.6$ nm, and nd2n denotes a refractive index of the negative lens in the second lens group at d-line; and the following conditional expressions being satisfied:

$$25 \leq vd4n \leq 40$$

when $25 \leq vd4n \leq 30$ $$-0.035 \times vd4n + 2.63 \leq nd4n \leq 1.79$$

when $30 < vd4n \leq 35$ $$1.58 < nd4n \leq 1.79$$

when $35 < vd4n \leq 40$ $$1.58 < nd4n \leq -0.034 \times vd4n + 2.98$$

where vd4n denotes Abbe number of the negative lens in the fourth lens group at d-line, and nd4n denotes a refractive index of the negative lens in the fourth lens group at d-line.

13. A method for varying a focal length of a zoom lens system that includes a first lens group, a second lens group, a third lens group, and a fourth lens group, the method comprising steps of:

providing the first lens group having negative refractive power, the second lens group having positive refractive power and consisting of two positive lenses or less and one negative lens, the third lens group having negative refractive power, and a fourth lens group having positive refractive power and consisting of two positive lenses or less and one negative lens;

varying a focal length from a wide-angle end state to a telephoto end state by decreasing a distance between the first lens group and the second lens group, increasing a distance between the second lens group and the third lens group, and decreasing a distance between the third lens group and the fourth lens group;

satisfying the following conditional expressions:

$$25 \leq vd2n \leq 40$$

when $25 \leq vd2n \leq 30$ $$-0.035 \times vd2n + 2.63 \leq nd2n \leq 1.79$$

when $30 < vd2n \leq 35$ $$1.58 < nd2n \leq 1.79$$

when $35 < vd2n \leq 40$ $$1.58 < nd2n \leq 0.034 \times vd2n + 2.98$$

where vd2n denotes Abbe number of the negative lens in the second lens group at d-line, which has a wavelength $\lambda=587.6$ nm, and nd2n denotes a refractive index of the negative lens in the second lens group at d-line; and the following conditional expressions being satisfied:

$$25 \leq vd4n \leq 40$$

when $25 \leq vd4n \leq 30$ $$-0.035 \times vd4n 2.63 \leq nd4n \leq 1.79$$

when $30 < vd4n \leq 35$ $$1.58 < nd4n \leq 1.79$$

when $35 < vd4n \leq 40$ $$1.58 < nd4n \leq -0.034 \times vd4n + 2.98$$

where vd4n denotes Abbe number of the negative lens in the fourth lens group at d-line, and nd4n denotes a refractive index of the negative lens in the fourth lens group at d-line.

14. The method according to claim 13, further comprising a step of:

satisfying the following conditional expressions:

$$25 \leq vd1p \leq 40$$

when $25 \leq vd1p \leq 30$ $-0.035 \times vd1p + 2.63 \leq nd1p \leq 1.79$ when $30 vd1p \leq 35$ $1.58 < nd1p \leq 1.79$ when $35 < vd1p \leq 40$ $1.58 \leq nd1p \leq -0.034 \times vd1p + 2.98$ where vd1p denotes Abbe number of the positive lens in the first lens group at d-line, which has a wavelength λ=587.6 nm, nd1p denotes a refractive index of the positive lens in the first lens group at d-line.

15. The method according to claim 13, further comprising steps of:

providing the first lens group that has a negative lens; and satisfying the following conditional expressions:

$30 \leq vd1n \leq 71$ when $30 \leq vd1n \leq 36$ $-0.013 \times vd1n + 2.083 \leq nd1n \leq 1.7$ when $36 vd1n \leq 41$ $-0.013 \times vd1n + 2.083 < nd1n \leq -0.004 \times vd1n + 1.844$ when $41 < vd1n \leq 51$ $-0.004 \times vd1n + 1.714 < nd1n \leq -0.004 \times vd1n + 1.844$ when $51 < vd1n \leq 61$ $-0.0015 \times vd1n + 1.5865 < nd1n \leq -0.004 \times vd1n + 1.844$ when $61 < vd1n \leq 71$ $-0.0015 \times vd1n + 1.5865 < nd1n \leq -0.009 \times vd1n + 2.149$ where vd1n denotes Abbe number of the negative lens in the first lens group at d-line, which has a wavelength λ=587.6 nm, nd1n denotes a refractive index of the negative lens in the first lens group at d-line.

16. The method according to claim 13, further comprising a step of:

satisfying the following conditional expression:

$1.2 < f2/fw < 2.0$ where f2 denotes a focal length of the second lens group, and fw denotes a focal length of the zoom lens system in the wide-angle end state.

* * * * *